US008320288B2

(12) United States Patent
Sakoda

(10) Patent No.: US 8,320,288 B2
(45) Date of Patent: Nov. 27, 2012

(54) COMMUNICATION SYSTEM, COMMUNICATION APPARATUS AND COMMUNICATION METHOD, AND COMPUTER PROGRAM

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 12/597,267

(22) PCT Filed: Apr. 4, 2008

(86) PCT No.: PCT/JP2008/056817
§ 371 (c)(1),
(2), (4) Date: Oct. 23, 2009

(87) PCT Pub. No.: WO2008/149598
PCT Pub. Date: Dec. 11, 2008

(65) Prior Publication Data
US 2010/0135195 A1 Jun. 3, 2010

(30) Foreign Application Priority Data
Jun. 4, 2007 (JP) .............................. P2007-148674

(51) Int. Cl.
G08C 17/00 (2006.01)
H04B 7/185 (2006.01)
(52) U.S. Cl. ..................... 370/311; 370/318; 455/574
(58) Field of Classification Search .................. 370/311, 370/318; 455/574
See application file for complete search history.

(56) References Cited

U.S. PATENT DOCUMENTS

| 5,771,352 | A | 6/1998 | Nakamura et al. |
| 6,028,853 | A | 2/2000 | Haartsen |
| 7,664,523 | B2 * | 2/2010 | Kaneko et al. ................ 455/522 |
| 8,116,246 | B2 * | 2/2012 | Min et al. ...................... 370/311 |
| 2005/0068934 | A1 | 3/2005 | Sakoda |
| 2005/0229221 | A1 * | 10/2005 | Kerofsky et al. ............. 725/100 |
| 2011/0310859 | A1 * | 12/2011 | Vedantham et al. .......... 370/336 |

FOREIGN PATENT DOCUMENTS

| JP | 7-336370 | 12/1995 |
| JP | 11-275106 | 10/1999 |

(Continued)

OTHER PUBLICATIONS

International Search Report from the Japanese Patent Office in International Application No. PCT/JP2008/056817 mailed Jul. 1, 2008.

(Continued)

Primary Examiner — Kenny Lin
(74) Attorney, Agent, or Firm — Finnegan, Henderson, Farabow, Garrett & Dunner, L.L.P.

(57) ABSTRACT

To suitably suppress distribution delay at the time of multi-hop communication or broadcast transfer while including a communication station in a power-saving state.
First, STA-A immediately transmits broadcast data to STA-B which is running in an active mode, and subsequently, executes transmission of a beacon at a TBTT when STA-C operates a receiver, and then transmits the broadcast data to the STA-C. Thus, the broadcast data can be distributed to the STA-B which is running in the active mode with the minimum delay, and on the other hand, the broadcast data is distributed to the STA-C which is running in a sleep mode in a sure manner while generating a delay quantity of only T0.

15 Claims, 15 Drawing Sheets

FOREIGN PATENT DOCUMENTS

| | | |
|---|---|---|
| JP | 2000-512098 | 9/2000 |
| JP | 2002-291067 | 10/2002 |
| JP | 2002-300175 | 10/2002 |
| JP | 2003-229869 | 8/2003 |
| JP | 2003-249936 | 9/2003 |
| JP | 2004-071022 | 8/2004 |
| JP | 2005-33557 | 2/2005 |
| JP | 2005-210694 | 8/2005 |
| JP | 2005-252692 | 9/2005 |
| JP | 2005-354634 | 12/2005 |
| JP | 2006-5933 | 1/2006 |
| JP | 2006-319586 | 11/2006 |
| JP | 2007-5859 | 1/2007 |
| JP | 2007-96898 | 4/2007 |
| JP | 2009-543476 | 12/2009 |

OTHER PUBLICATIONS

International Search Report dated Jul. 1, 2008, from the Japanese Patent Office in corresponding PCT Patent Application No. PCT/JP2008/056817.

* cited by examiner

COMMUNICATION SYSTEM, COMMUNICATION APPARATUS AND COMMUNICATION METHOD, AND COMPUTER PROGRAM

TECHNICAL FIELD

The present invention relates to a communication system, a communication apparatus and communication method, and a computer program, wherein communication is executed mutually between multiple wireless stations such as wireless LAN (Local Area Network) or PAN (Personal Area Network), and specifically, relates to a communication system, a communication apparatus and communication method, and a computer program, wherein each communication station having no relationship between a control station and a controlled station operates in an autonomous distributed manner.

Further, specifically, the present invention relates to a communication system, a communication apparatus and communication method, and a computer program, wherein communication stations execute data communication in an autonomous distributed manner while executing a power-saving operation for each communication station, and specifically, relates to a communication system, a communication apparatus and communication method, and a computer program, wherein distribution delay at the time of multi-hop communication or broadcast transfer is suppressed, while including a communication station in a power-saving state.

BACKGROUND ART

Wireless networks have been given attention as a system to escape from wiring according to conventional cable communication methods. For example, wireless LAN standards, such as IEEE (The Institute of Electrical and Electronics Engineers) 802.11a, IEEE802.11b, and IEEE802.1g, are typical. According to a wireless LAN, flexible Internet connection can be done, and not only existing cable LANs can be replaced but also Internet connection means can be provided even in public places such as hotels, airport lounges, train stations, cafés, or the like. Wireless LANs have already come into widespread use, and a wireless LAN function has been commonly implemented in not only information equipment such as personal computers (PC) or the like but also in CE (Consumer Electronics) devices such as digital cameras, music players, and so forth.

In order to configure a LAN using wireless technology, a method has commonly been used wherein a single apparatus serving as a control station called "access point (AP)" or "coordinator" is provided within an area, and a network is formed under the central control of this control station. The control station adjusts the access timings of multiple terminal stations within the network, and executes synchronous wireless communication wherein the respective terminal stations are synchronized mutually.

Also, Ad-hoc communication has been devised as another method for configuring a wireless network, wherein all the terminal stations are on an equal, and operate with peer-to-peer in an autonomous distributed manner, the terminal stations themselves determine access timing. Particularly, with a small wireless network configured of a relatively few clients positioned nearby, Ad-hoc communication can be conceived to be suitable wherein arbitrary terminals can execute asynchronous wireless communication directly without using a particular control station.

For example, networking with IEEE802.11 is based on the concept of BSS (Basic Service Set). The BSS is configured of two types of a BSS defined in "infrastructure mode" where there is a control station, and an IBSS (Independent BSS) defined in "Ad-hoc mode" where a network is just configured of multiple MTs (Mobile Terminal: mobile station or terminal station).

First, description will be made regarding the operation at the time of the infrastructure mode according to IEEE802.11.

Under the infrastructure mode, an AP integrates a range where electric waves arrive in the vicinity of the self station as a BSS, thereby configuring what is called a "cell" with a so-called cellular system. Terminal stations (MTs) in the vicinity of the AP are accommodated within the AP, and join a network as a member of this BSS. Specifically, the AP transmits a control signal called a beacon at an appropriate time interval, and an MT which can receive this beacon recognizes that the self station is in the vicinity of the AP, and further executes connection establishment with the AP thereof.

FIG. 16 illustrates an operation example of IEEE802.11 at the time of the infrastructure mode. With the example shown in the drawing, a communication station STA0 operates as an AP, and other communication stations STA1 and STA2 operate as an MT. The communication station STA0 serving as the AP transmits a beacon (Beacon) at a certain time interval, such as shown in the chart on the right side in the drawing. The AP internally manages the transmission interval of a beacon as a parameter called target beacon transmission time (TBTT: Target Beacon Transmit Time), and activates a beacon transmission procedure whenever time reaches the TBTT. Also, the beacon annunciated from the AP includes a beacon interval field, and the surrounding MTs can recognize the next beacon transmission time TBTT from this beacon interval field and the reception time of the beacon thereof.

Here, the BSS proceeds to a power-saving mode (Power-Save) as appropriate, where each MT executes a reception operation only in an intermittent manner, whereby low power consumption can be realized. Under the power-saving mode, at least a part of the MTs within the BSS operate in the sleep mode, and alternately enter into an Awake state where the transmitter and receiver are operated, or a Doze state where the power of the transmitter and the power of the receiver are turned off. The MTs can recognize the next beacon transmission time from the received beacon, and accordingly, under the sleep mode, when reception does not have to be executed, the MTs may turn off the power of the receiver to enter into a power-saving state until the next TBTT or the TBTT of multiple times ahead. The AP manages the timing where each MT in a sleep state awakes, in a central manner, and executes frame transmission to the MT in accordance with the timing of an Awake state, thereby assisting a power-saving operation. Note that an MT not in the sleep mode is called an active mode, where the transmitter and receiver are operated constantly (see FIG. 17).

The AP sometimes transmits broadcast data to the multiple MTs in a broadcasting manner. When at least a part of the MTs which communicates with the self station are under the sleep mode, the AP buffers transmission data internally at the time of executing broadcast transmission, and transmits this data immediately after transmitting a beacon. This cycle is informed with information included in the beacon, and each MT can recognize the TBTT when this broadcast data is transmitted. Upon recognizing the timing when the broadcast data is transmitted, the MT under the sleep mode awakes at this timing to operate the receiver. Thus, the broadcast data can be distributed to the MT under the sleep mode.

Subsequently, the operation at the time of the Ad-hoc mode according to IEE802.11 will be described.

With the Ad-hoc mode (IBSS) according to IEEE802.11, at the time of the multiple MTs recognizing the presence of each other, an IBSS is defined autonomously. These MT groups determine a TBTT with a certain interval. The transmission interval of a beacon is notified with a parameter within a beacon signal, and once the beacon signal is received, each MT can calculate the next TBTT. Subsequently, upon referencing a clock within the self station to recognize that the TBTT has come, each MT transmits a beacon after delay of random time in the case of recognizing that none of the MTs has transmitted a beacon. The MT which can receive this beacon can join this IBSS.

FIG. 18 illustrates an operation example of IEEE802.11 at the time of the Ad-hoc mode. The example shown in the drawing illustrates a situation wherein two communication stations STA1 and STA2 which operate as an MT make up an IBSS. In this case, one of the MTs belonging to the IBSS transmits a beacon each time the TBTT arrives. Also, there is a case where the beacons transmitted from the MTs collide.

With IEEE802.11, the power-saving (PowerSave) mode is stipulated with regard to IBSS as well, and the MTs can enter into a Doze state wherein the power of the receiver is turned off as appropriate. A predetermined time zone from a beacon transmission time TBTT is defined as an ATIM (Announcement Traffic Indication Message) Window. All the MTs belonging to the IBSS are in an Awake state until the period of the ATIM Window expires, and an MT which basically operates in the sleep mode can receive a beacon during this time zone. Subsequently, the MT can enter into a Doze state until the next beacon transmission time TBTT since completion of the ATIM Window.

In the case of the self station having information addressed to some station, each MT transmits an ATIM packet to the above communication partner during the time zone of this ATIM Window, thereby informing the reception side that the self station holds transmission information. On the other hand, the MT which has received the ATIM packet does not proceed to a Doze state until the reception from the station which transmitted the ATIM packet is completed, and operates the receiver continuously.

FIG. 19 illustrates an operation example in the case that there are three MTs of STA1, STA2, and STA3 within an IBSS. Upon the TBTT arriving, each MT of the STA1, STA2, and STA3 operates the backoff timer while monitoring a medium state for random time. With the example shown in the drawing, the timer of the STA1 expires earliest, and transmits a beacon. The STA1 has transmitted a beacon, and accordingly, the STA2 and STA3 which have received this do not transmit a beacon.

Now, let us say that the STA1 holds information addressed to the STA2, and the STA2 holds information addressed to the STA3. In such a case, the STA1 transmits a beacon, and then the STA2 receives the beacon, and then each of the STA1 and STA2 operates the backoff timer while monitoring a medium state for random time again. With the example shown in FIG. 19, the backoff timer of the STA2 expires earlier, and accordingly, first, an ATIM message is transmitted from the STA2 to the STA3. Upon receiving this ATIM message, the STA3 waits for just a short frame interval (SIFS: Short Inter-Frame Space), and then replies to the STA2 an ACK (Acknowledge) packet indicating that the ATIM message has been received. Upon transmission of the ACK from the STA3 being completed, the STA1 further operates the backoff timer while monitoring a medium state for random time, and upon the timer thereof expiring, the STA1 transmits the ATIM packet to the STA2. Subsequently, after the SIFS elapses, the STA2 replies to the STA1 an ACK packet indicating that the ATIM packet has been received.

Upon such exchange between the ATIM packet and the ACK packet being executed within the ATIM Window, the STA3 operates the receiver to receive the information from the STA2, and also the STA2 operates the receiver to receive the information from the STA1, for the subsequent sections as well.

The STA1 and STA2, which hold transmission information, wait for just a distributed frame interval (Distributed Inter-Frame Space: DIFS) equivalent to the minimum time when the medium is in an idle state immediately after completion of the ATIM Window, and then operates the backoff timer while monitoring each medium state for random time. With the example shown in FIG. 19, the backoff timer of the STA2 expires earlier, and accordingly, a data frame addressed to the STA3 is transmitted previously from the STA2. Subsequently, after the SIFS elapses, the STA3 replies to the STA2 an ACK packet indicating that the data frame has been received.

After the transmission of the data frame is completed, the STA1 waits for just the DIFS, and then further operates the backoff timer while monitoring the medium state for random time again, and upon the timer thereof expiring, the STA1 transmits a data frame addressed to the STA2. Subsequently, after the SIFS elapses, the STA2 replies to the STA1 an ACK packet indicating that the data frame has been received.

With the above procedure, the MT which has not received an ATIM packet within the ATIM Window, and does not hold information addressed to some station, turns off the power of the transmitter and the power of the receiver until the next TBTT, whereby consumption power can be reduced.

Also, in addition to the Ad-hoc mode stipulated with IEEE802.11, development relating to a communication system has been done wherein each communication station having no relationship between a control station and a controlled station operates in an autonomous distributed manner.

For example, a wireless communication system has been proposed wherein the respective communication stations mutually transmit a beacon in which information relating to a network is described to construct a network, thereby constructing an autonomous distributed network having no relationship between a control station and a controlled station, and accordingly, the communication state and the like of another communication station can be determined with the beacon thereof sophisticatedly (e.g., see Patent Document 1). This wireless communication system will be described next.

FIG. 20 and FIG. 21 illustrate an operation example with the wireless communication system, and an example of a transmission/reception procedure between communication stations. As shown in FIG. 20, there are two communication stations of the STA1 and STA2 in a mutually communicable range as an MT to join the network, and each MT sets each corresponding TBTT, and transmits a beacon signal periodically. Each MT extracts the information of an adjacent MT, and accordingly, receives the beacon signal of each MT periodically as appropriate.

Also, let us assume here that the STA1 enters into the sleep mode wherein the power of the transmitter and the power of the receiver are turned off as appropriate, and an MT in the power-saving mode alternately enters into an Awake state wherein the transmitter and receiver are operated, or a Doze state wherein the power of the transmitter and the power of the receiver are turned off (similar to the above).

FIG. 21 exemplifies a situation wherein data transmission is executed from the STA2 to the STA1. The upper stage in the drawing illustrates a packet transmission/reception sequence between the STA1 and the STA2, and the lower stage in the drawing illustrates the operation states of the transmitter and receiver of the STA1 serving as a data reception destination (level high indicates an Awake state, and level low indicates a Doze state). Note that, when both of the transmitter and receiver are in a Doze state, the communication station thereof enters into a power-saving state, and when one of the transmitter and receiver is in an Awake state, the current time is included in a time zone when the communication station thereof is not in a power-saving state.

With the MTs, a reception period (Listen Period) made up of a certain time zone is provided after transmitting a beacon, and the receiver is operated during this period. Subsequently, when traffic addressed to itself was not received during this Listen Period, the MTs can turn off the power of the transmitter and the power of the receiver to proceed to a power-saving state. With the example shown in FIG. 21, after transmitting a beacon B1-0, the STA1 operates the receiver for a while, and the STA2 has transmitted a packet to the STA1 during this period, whereby the STA1 can receive this.

Information called TIM (Traffic Indication Map) is described in a beacon signal. The TIM is annunciation information regarding whether or not this communication station has information addressed to which station at present, and a beacon receiving station can recognize whether or not itself has to execute reception by referencing this TIM. Each MT receives the beacon signal of a surrounding MT periodically, analyzes this TIM, and upon confirming that there is no data addressed to itself, turns off the power of the receiver to enter into a sleep state, but upon confirming that there is data addressed to itself, enters into a state wherein this data is received rather than entering into a sleep state.

FIG. 21 exemplifies a case where, with the TIM of the beacon B2-1, the STA1 has been called from the STA2. The STA1 which has received the beacon thereof executes response answering the call (0). Further, upon the STA2 which has received the response confirming that the STA1 is in a receivable state, the STA2 transmits a packet addressed to the STA1 (1). The STA1 which has received this confirms that the packet has been received normally, and then transmits an ACK (2).

As described with reference to FIG. 19, and FIG. 20 and FIG. 21, at the time of transferring data to a communication station which is in a Doze state under the sleep mode, the communication station serving as a data transmission source has to pass through a predetermined procedure. On the other hand, a communication station which does not communicate with a communication station under the sleep mode does not have to pass through such a procedure.

With the present specification, let us say that capabilities to execute data transfer as to a communication station under the sleep mode which repeats a Doze state and an Awake state alternately through a predetermined procedure will be referred to as "power-saving assistance". The power-saving assistance mentioned here is similar to capabilities wherein an AP in the infrastructure mode centrally manages the timing when each MT in a sleep state awakes, and executes frame transmission in accordance with the timing of each MT in an Awake state. On the other hand, a communication station having no power-saving assistance capabilities has difficulty in executing data transfer to a communication station under the sleep mode. Accordingly, even if a communication station itself has a power-saving function to repeat a Doze state and an Awake state alternately, if a communication partner has no power-saving assistance function, the communication station itself has difficulty in proceeding to the sleep mode (upon proceeding to the sleep mode, data communication is disabled). That is to say, with a pair of communication stations to execute data communication, in order for one of the communication stations to proceed to the sleep mode, the other communication station has to have a power-saving assistance function.

Therefore, as one methodology wherein each MT realizes a power-saving operation with a communication system under the Ad-hoc mode (or autonomous distributed type), an arrangement can be conceived wherein information indicating the attributes of a communication station regarding whether or not capabilities to communicate with a communication station under the sleep mode (power-saving assistance) are possessed, and whether or not capabilities to proceed to the sleep mode (or whether to intend to proceed to the sleep mode) are possessed, is included in a beacon signal whereby mutual notification is performed, to match communication station attributes with each other, thereby determining beforehand whether a communicable relationship can be realized (or whether to be able to proceed to the sleep mode).

Under a communication environment where there are two communication stations STA1 and STA2 such as shown in the left of FIG. 20, in the case that one of the communication stations intends to proceed to the sleep mode, there has to be confirmed with reception of a beacon beforehand that the other communication station serving as a communication partner provides "power-saving assistance". FIG. 22 and FIG. 23 each illustrate an example where matching of communication station attributes is executed.

With the example shown in FIG. 22, both stations display intent to enter into the sleep mode, but simultaneously, both stations provide "power-saving assistance", and accordingly, the STA1 and STA2 match communication station attributes from the mutual beacon signal, whereby the STA1 and STA2 can enter into a communicable state.

On the other hand, with the example shown in FIG. 23, the STA2 displays intent to enter into the sleep mode, but the STA1 serving as a communication partner does not provide "power-saving assistance", and accordingly, it is apparent that when the STA2 enters into the sleep mode, communication will break down. In such a case, the STA1 has difficulty in continuing communication, and accordingly, the STA1 may reject entering into a communication state with the STA2. Also, similarly, the STA2 has difficulty in proceeding to the sleep mode, and accordingly, the STA2 may reject entering into a communication state with the STA1.

Incidentally, with a wireless network, a terminal station serving as a communication partner is not necessarily accommodated in a range where the mutual electric waves arrive, so a great number of terminals are connected mutually with "multi-hop communication" wherein multiple communication stations transmit frames by relay. At present, standardization relating to multi-hop communication is proceeding as one task group within IEEE802.11. Within the present specification, let us say that a wireless network to execute multi-hop communication will be referred to as "mesh network", and each communication station making up a mesh network will be referred to as "mesh point (MP)".

The above Ad-hoc network wherein each communication station executes a communication operation in an autonomous distributed manner differs from a conventional fixed network, change in topology frequently occurs, so there has to be established a route control method, i.e., a routing protocol. For example, an on-demand routing protocol has been proposed by MANET (Mobile Adhoc NEtwork Working Group) of IETF (Internet Engineering Task Force) and others, wherein a route finding request is transmitted immediately before communication so as to create a route. As typical routing protocols, AODV (Adhoc On-demand Distance Vector), DSR (Dynamic Source Routing), TORA (Temporally Ordered Routing Algorithm), or the like can be exemplified. Any method of these basically has a procedure wherein creation of a route is started when receiving a data packet transmission request (route creation request), and communication is started when the route is created (i.e., transmission of a data packet is started).

As an example of a route setting procedure used for executing multi-hop communication, the function of the AODV will be described with reference to FIG. 24. In the drawing, three communication stations STA-A, STA-B, and STA-C are in a range where electric waves arrive mutually, but a situation is assumed wherein only the STA-D and STA-C are in a range where electric waves arrive.

With the AODV, for example, in the case that the STA-A attempts to transmit data to the STA-D, a procedure to check whether to transfer data in what kind of route is activated. First, the STA-A transmits a control packet called a route finding request message RREQ (Route Request) using broadcast, and waits for a route reply message RREP (Route Reply) from the STA-D which is a target station.

Information is described in the RREQ, such as the address of a route source station (STA-A in this case) and the address of a target communication station (STA-D in this case), a route metric value, and so forth. The route metric value mentioned here is a scale indicating the quality of a route or the like, and is represented with information accumulated so far from a route source station, for example, such as the number of hops, data rate, data rate×(1−packet error rate), or statistical data combined from these.

Upon confirming that the RREQ is a message of which the route target is not the self station, each of the STA-B and STA-C which have received the RREQ from the STA-A transfers this RREQ to a further communication station using broadcast again. At this time, a reversed route (Reverse Path) to the STA-A serving as a transmission destination of a route request message is set. The reversed route mentioned here means a route where a nearby terminal which transmitted the route request message is the next transfer destination in the case that a request occurs desiring to transmit data to the transmission source of the RREQ.

Subsequently, upon receiving the RREQ transferred from the STA-C, the STA-D confirms that the target of the RREQ thereof is the self station, and replies a RREP as to the STA-A. The RREP transmitted from the STA-D is received at the STA-C serving as a relay station, and further, the STA-C transfers the RREP to the STA-A.

The STA-A can recognize that data can be transferred to the STA-D via the STA-C by using such a route setting procedure, and simultaneously, the STA-C can extract information necessary as a relay station. The AODV has been exemplified here, but it goes without saying that, with a route setting procedure other than the AODV, it is common to set a route through exchange of broadcast control information.

Patent Document 1: WO2004/071022

DISCLOSURE OF INVENTION

Technical Problem

Description has been made so far regarding each communication station executing a power-saving operation, or executing multi-hop communication (broadcast data transfer is used as a route setting procedure) with an autonomous distributed type network such as the Ad-hoc mode or the like. However, in order to realize broadcast communication while a part of communication stations are in a power-saving state with the autonomous distributed type network, the present inventors consider problems such as the following to exist.

One is a data transfer latency problem.

With a communication system wherein the transmission/reception of data is executed according to autonomous distributed control such as described above, a sleep mode is defined as a power-saving mode wherein a communication station repeats a Doze state and an Awake state alternately. However, a communication station which has entered into the sleep mode operates the receiver only during a restricted time zone, and accordingly, it commonly takes time to transfer data to a communication station which has entered into the sleep mode. When assuming a case where the data transmission method of broadcast used in the infrastructure mode of IEEE802.11 is used at the same time, in order to transfer the data of broadcast to the communication station which is in the sleep mode, the data of broadcast is buffered within a transmission station, and accordingly, distribution of data to a communication station which has not entered into the sleep mode (a communication station in the active mode) is also delayed.

Impact when configuring a mesh network for multi-hop communication is exemplified as another problem.

Let us assume a case where multi-hop communication in which multiple communication stations transfer data by relay is executed between communication stations which execute access control using the data transmission method of broadcast used in the infrastructure mode according to IEEE802.11 at the same time as described above. As previously mentioned, in order to execute multi-hop communication, the control information of broadcast has to be exchanged in a route setting procedure to set a route before transferring data. However, when a part of the communication stations which can serve as a relay station have entered into the sleep mode, transmission data is buffered within a communication station serving as a transmission source at the time of transferring a RREQ to such communication stations by broadcast, and accordingly, great delay occurs as to transfer of this control data. Such a phenomenon occurs at each relay station which transfers a RREQ in a chained manner, and accordingly, great delay occurs in a route setting.

Determination regarding whether or not a communication station in the sleep mode will be a relay station is exemplified as yet another problem.

For example, with a layout of communication stations such as shown in FIG. 25, in the case that multi-hop communication is executed between the STA-A and STA-D, there are two routes, to pass through the STA-B or STA-C, and accordingly, determination has to be made regarding whether to pass through either the STA-B or the STA-C. If we say that the STA-C is in the sleep mode, it will be able to be understood intuitively that the STA-B should be passed through. However, in the case of a layout of communication stations shown in FIG. 24, the STA-D is in a range where electric waves arrive from the STA-C alone, and there is one route, and accordingly, even when the STA-C is under the sleep mode, the STA-C has to be used as a relay station. Thus, in the case that there are a communication station under the sleep mode and a communication station other than the sleep mode as multi-hop relay candidate stations, a route should be set while taking into consideration the power consumption of each station, but such a route setting procedure does not exist at the present.

The present invention has been made taking such technical problems into consideration, and it is an object thereof to provide an excellent communication system, communication apparatus and communication method, and computer program whereby each of communication stations having no relationship between a control station and a controlled station can execute a suitable communication operation in an autonomous distributed manner.

It is a further object of the present invention to provide an excellent communication system, communication apparatus and communication method, and computer program whereby communication stations can execute autonomous distributed data communication suitably while executing a power-saving operation for each communication station.

It is a further object of the present invention to provide an excellent communication system, communication apparatus and communication method, and computer program whereby distribution delay at the time of multi-hop communication or broadcast transfer can be suppressed suitably while including a communication station in a power-saving state.

It is a further object of the present invention to provide an excellent communication system, communication apparatus and communication method, and computer program whereby a route setting can be executed suitably while taking into consideration the power consumption of each relay candidate station of multi-hop at the time of executing multi-hop communication wherein multiple communication stations transmit frames by relay under a communication environment where each of the communication stations operates in an autonomous distributed manner.

Technical Solution

The present invention has been made to take the above problems into consideration, and a first aspect thereof is a communication system characterized in being made up of a plurality of communication stations which operate in an autonomous distributed manner, with at least a part of the communication stations being power-saving communication stations which operate in a sleep mode where a transmitter and a receiver are operated in an intermittent manner, and at least a part of the other communication stations being power-saving assistance stations having capabilities to communicate with the power-saving communication stations;

and with at least a part of the power-saving assistance stations having a low-delay broadcast distribution function to execute data transmission each time each of the communication stations serving as a transmission destination enters into an active state for activating the receiver, i.e., multiple times at the time of broadcast data distribution.

Note that the "system" as used here means that in which multiple apparatuses (or function modules to realize a particular function) are gathered logically, and whether or not each apparatus or function module is in a single casing is irrelevant (the same hereinafter).

With the communication system according to the first aspect of the present invention, at least a part of the communication stations operate as power-saving communication stations which operate in a sleep mode where a transmitter and a receiver are operated in an intermittent manner, and on the other hand, at least a part of the other communication stations operate as power-saving assistance stations having capabilities to communicate with the power-saving communication stations. The power-saving assistance stations can manage the timing when each adjacent station in a sleep state awakes, for example.

Subsequently, the power-saving assistance stations execute broadcast data distribution each time each communication station in a communication state enters into an active state.

More specifically, upon broadcast traffic data arriving from a higher layer protocol, a power-saving assistance station immediately transmits the broadcast traffic data to a communication station under the active mode, whereby broadcast distribution can be executed with a low-delay quantity.

Also, the power-saving assistance station does not execute data distribution as to a power-saving communication station in which the receiver is in a Doze state at the time of the broadcast traffic data being generated, and transmits the broadcast traffic data at timing when the receiver enters into an Awake state next. That is to say, the power-saving assistance station distributes the broadcast data to a power-saving communication station in a sure manner while generating a delay quantity. Consequently, the power-saving assistance station has put forth its best efforts regarding distribution delay.

Now, let us say that the communication system includes means configured to mutually notify communication station attributes regarding whether or not each adjacent communication station is a power-saving communication station, whether or not each adjacent communication station is a power-saving assistance station, or whether or not each adjacent communication station has the low-delay broadcast distribution function. Such means are realized by exchanging beacon signals or the other control data between adjacent communication stations, for example.

Subsequently, the communication stations which have notified the communication station attributes mutually determine whether to enter into a communication state based on matching results of the mutual communication station attributes. Specifically, the power-saving communication stations select not to enter into a communication state with a communication station which is not a power-saving assistance station. This is because a communication station which is not a power-saving assistance station does not have the above low-delay broadcast distribution function, and accordingly, there are concerns that distribution of broadcast data may be delayed due to the sleep mode of the self station. Similarly, the communication stations which are not a power-saving assistance station do not have the low-delay broadcast distribution function, in order to eliminate the same concerns, may select not to enter into a communication state with a power-saving communication station.

Also, the power-saving assistance stations recognize a period when a power-saving communication station activates the receiver, and accordingly, even if the power-saving assistance stations have no low-delay broadcast distribution function, the power-saving assistance stations can execute broadcast distribution according to the same methodology as with the AP in the infrastructure mode according to conventional IEEE802.11. In such a case, there are concerns that great delay may occur depending on the timing of the intermittent reception operation of a power-saving communication station. Therefore, it is desirable that the power-saving communication stations select whether to enter into a communication state with a power-saving assistance station having no low-delay broadcast distribution function while taking into consideration restrictions relating to distribution delay imposed on the system.

That is to say, when restrictions relating to distribution delay of broadcast data are not imposed on the communication system, a failure does not occur even when entering into a communication state with an adjacent station, and accordingly, a procedure used for entering into a communication state with this adjacent station is activated. However, when restrictions relating to distribution delay of broadcast data are imposed on the communication system, there are concerns that the distribution of broadcast data may be delayed due to the sleep mode of the self station, and the restrictions may not be able to be observed, and accordingly, such a power-saving assistance station is determined to be a station with which the self station does not enter into a communication state.

Also, a second aspect of the present invention is a communication system characterized in being made up of a plurality of communication stations which operate in an autonomous distributed manner, with at least a part of the communication stations being power-saving communication stations which operate in a sleep mode for operating a transmitter and a receiver intermittently, including means configured to notify an adjacent station of information relating to whether or not the power-saving communication stations intend to operate as relay stations at the time of the plurality of communication stations executing multi-hop communication for transmitting frames by relay. Here, the notifying means are realized by exchanging beacon signals or the other control data between adjacent communication stations, for example.

Upon setting a communication station under the sleep mode as a relay station, data is buffered at the front communication station on the route, and accordingly, there are concerns that great delay may occur in data transfer. On the other hand, according to the communication system according to the second aspect of the present invention, at the time of transferring control data relating to a route setting for multi-hop communication, the communication stations determine whether to transfer the control data to each adjacent power-saving communication station according to the presence/absence of relay intention confirmed beforehand, whereby falling into such a dangerous situation is avoidable.

Also, the communication stations having the above low-delay broadcast distribution function may execute data transmission each time each communication station serving as a transmission destination enters into an active state for activating the receiver, i.e., multiple times, at the time of transferring control data relating to a route setting for multi-hop communication. In such a case, the control data of a route setting request can be distributed to a desired address with fewer delay quantities. Moreover, the control data of a wasteful route setting request is not transmitted to a power-saving communication station having no relay intention, i.e., execution of wasteful transmission and reception can be prevented.

Also, in the case that a power-saving communication station indicates intention to operate as a relay station, when there are two or more routes including a route not to be relayed at the power-saving communication station, and a route to be relayed at the power-saving communication station, and two pieces of route setting data arrive, a route destination station (not only compares a route metric value but also) selects no route where the route setting data has arrived late, or selects a route where the route setting data has arrived earliest, whereby control can be made so as not to select a route including a power-saving communication station as a relay station as less as possible.

Alternatively, the power-saving communication stations give a bias value to a route metric value, in the case of intending to operate as a relay station, at the time of intending to operate as a relay station, whereby control can be made so as to prevent a route destination station from selecting a route including a power-saving communication station as a relay station as less as possible.

Also, a third aspect of the present invention is a communication apparatus characterized in executing data communication under a communication environment made up of a plurality of communication stations which operate in an autonomous distributed manner, including:

communication means configured to execute transmission/reception with the communication environment;

communication control means configured to control a communication operation by the communication means; and state control means configured to control the state transition between an active mode for operating the transmitter and the receiver of the communication means constantly, and a sleep mode for operating the transmitter and the receiver of the communication means intermittently;

with the state control means controlling the state transition between the active mode and the sleep mode according to the traffic exchange quantity and the traffic reception quantity of the communication means;

and with the communication control means adjusting a predetermined interval where the transmitter and the receiver of the communication means are operated intermittently under the sleep mode according to the traffic transmission and the traffic reception quantity of the communication means.

In the case that a network where each communication station operates in an autonomous distributed manner is configured of a power-saving communication station wherein the transmitter and the receiver are operated intermittently, and a power-saving assistance station which executes broadcast data distribution with the power-saving communication station according to the above low-delay broadcast distribution function, there is a trade-off relationship wherein upon providing a longer cycle when the power-saving communication station activates the transmitter and the receiver such as a beacon transmission interval or the like, the advantage of low consumption power is improved, on the other hand, time needed until data transmission to all of the destination stations is completed is prolonged even if the low-delay broadcast distribution is used.

Therefore, the communication apparatus according to the third aspect of the present invention executes switching control of the operation mode of the communication apparatus, and adjustment of the beacon transmission interval so as to realize trade-off between the delay quantity of data transmission, and consumption power.

Specifically, when determining that there is no traffic to be transmitted or received, the communication apparatus proceeds to the sleep mode from the active mode, and extends the beacon transmission interval in a stepwise manner according to further determining that there is no traffic to be transmitted or received, thereby entering into a more effective low consumption power mode. Upon extending the beacon transmission interval, the delay quantity used for the distribution of data increases, but if there is little traffic within the network, such delay quantity can be allowed.

Also, under the sleep mode, when traffic to be transmitted or received occurs, conversely, the communication apparatus reduces the beacon transmission interval in a stepwise manner, thereby controlling the delay quantity of data transfer so as to be shortened, and when further a large quantity of transmission/reception traffic occurs, the communication apparatus proceeds to the active mode from the sleep mode.

Also, a fourth aspect of the present invention is a battery-driven communication apparatus characterized in being configured to execute data communication under a communication environment, which is made up of a plurality of communication stations which operate in an autonomous distributed manner, where multi-hop communication for the plurality of communication stations transmitting frames by relay is executed, including:

communication means configured to execute transmission/reception with the communication environment;

communication control means configured to control a communication operation by the communication means;

remaining power detecting means configured to detect the remaining power of the battery; and state control means configured to control the state transition between an active mode for operating the transmitter and the receiver of the communication means constantly, and a sleep mode for operating the transmitter and the receiver of the communication means intermittently;

with the state control means controlling the state transition between the active mode and the sleep mode according to the remaining power of the battery;

and with the communication control means determining whether to operate as a relay station at the time of multi-hop communication under the sleep mode, or a predetermined interval used for operating the transmitter and the receiver of the communication means intermittently according to the remaining power of the battery.

As described above, with the communication system according to the second aspect of the present invention, a communication station under the sleep mode notifies an adjacent station of an attribute regarding whether the self station has intention to become a relay station at the time of multi-hop communication. Here, upon the communication station under the sleep mode being set to a relay station, there are concerns that delay of data distribution may occur, and also, opportunities for transmission and reception increase as for the communication station, and accordingly, a problem is caused wherein consumption power increases.

Therefore, with the communication apparatus according to the fourth aspect of the present invention, in addition to a common power-saving operation wherein the state transition between the active mode and the sleep mode is controlled according to the remaining power of the battery, determination is made based on the remaining power of the battery whether to operate as a relay station at the time of multi-hop communication under the sleep mode. It goes without saying that a predetermined interval where the transmitter and the receiver are operated intermittently under the sleep mode may be determined, similarly, according to the remaining power of the battery.

The operation mode of a communication station, the presence/absence of relay intention, and the beacon transmission interval represent the degree of willingness to participate in the network. Accordingly, according to the above operations, the communication station can control how positively the communication station participates in the network, according to the remaining power of the battery.

Also, a fifth aspect of the present invention is a communication system characterized in being made up of a plurality of communication stations which operate in an autonomous distributed manner, with at least a part of the communication stations being power-saving communication stations which operate in a sleep mode for operating a transmitter and a receiver intermittently;

and with at the time of the plurality of communication stations executing multi-hop communication for transmitting frames by relay, during a time zone where not to operate as relay stations, the power-saving communication stations operating in the sleep mode, and during a time zone where to operate as relay stations, the power-saving communication stations executing relay processing still in the sleep mode, or proceeding to an active mode to execute relay processing.

Upon setting a communication station under the sleep mode as a relay station, data is buffered at the front communication station on the route, and accordingly, there are concerns that great delay may occur in data transfer. On the other hand, according to the communication system according to the fifth aspect of the present invention, at the time of executing multi-hop communication, during a time zone where to operate as relay stations, and during a time zone where to operate as relay stations, the power-saving communication stations execute relay processing still in the sleep mode, or proceed to an active mode to execute relay processing. Specifically, during a time zone where the self station needs to operate as a relay station, a power-saving communication station proceeds to the active mode to execute frame transfer processing, thereby avoiding falling into a situation wherein data is buffered at the front communication station on the route, and great delay occurs in data transfer. Also, in such a case, upon elimination of a route where the self station is operated as a relay station, the power-saving communication station should proceed to the sleep mode.

Also, at the time of executing multi-hop communication, during a time zone where to operate as relay stations, the power-saving communication stations may annunciate an adjacent station of information indicating whether to execute relay processing still in the sleep mode, or whether to proceed to an active mode to execute relay processing. In such a case, at the time of transferring control data relating to a route setting for multi-hop communication, at least a part of the communication stations belonging to this network can determine whether to transfer the control data to an adjacent power-saving communication station, according to the information indicating whether to execute relay processing still in the sleep mode, or whether to proceed to an active mode to execute relay processing.

Also, a communication station having no intention to proceed to the active mode to execute relay at the time of operating as a relay station, discards the control data of a route setting request, thereby preventing the self station from being selected as a relay station. Thus, falling into a situation wherein great delay occurs in data transfer at the time of multi-hop is avoidable.

Also, a communication station which generates a route setting request may include request information indicating whether or not all of the communication stations within this route request operate in the active mode, in the control data of the route setting request. For example, in the case of determining that the transmission delay restrictions of an application to be transmitted using a route to be generated are great, the communication station which generates a route setting request sets information to the effect that the communication stations within the route operate in the active mode, to the above request information. Alternatively, when the above request information is set at the time of transferring the control data of a route setting request for multi-hop communication, at least a part of the communication stations belonging to this network do not transfer the control data of the route setting request to a communication station having no intention to execute relay in the active mode, which has been confirmed beforehand. Also, a communication station having intention to proceed to the active mode to execute relay proceeds to the active mode in response to reception of the control data of a route setting request, and upon elimination of a route where the self station has operated as a relay station also proceeds to the sleep mode.

Thus, at the time of multi-hop, a route is set by a communication station which operates in the active mode, falling into a situation wherein great delay occurs in data transfer is avoidable.

Advantageous Effects

According to the present invention, an excellent communication system, communication apparatus and communication method, and computer program can be provided, whereby communication stations can execute autonomous distributed data communication suitably while executing a power-saving operation for each communication station.

Also, according to the present invention, an excellent communication system, communication apparatus and communication method, and computer program can be provided, whereby distribution delay at the time of multi-hop communication or broadcast transfer can be suppressed suitably while including a communication station in a power-saving state.

Also, according to the present invention, an excellent communication system, communication apparatus and communication method, and computer program can be provided, whereby a route setting can be executed suitably while taking into consideration the power consumption of each relay candidate station of multi-hop at the time of executing multi-hop communication wherein multiple communication stations transmit frames by relay under a communication environment where each of the communication stations operates in an autonomous distributed manner.

According to the present invention, with an autonomous distributed network where the respective communication stations are connected with peer-to-peer, even in the case that a part of the communication stations execute a power-saving operation, a data transfer latency problem at the time of executing broadcast transfer is solved, and also at the time of multi-hop communication determination is made suitably whether to set a communication station which operates in a power-saving manner to a relay station, and a route with less delay is set, whereby a mesh network can be configured.

Further objects, features, and advantages of the present invention will become apparent from detailed explanation based on the later-described embodiments of the present invention and the attached drawings.

EXPLANATION OF REFERENCE NUMERALS

1 CPU, 2 ROM, 3 RAM, 4 peripheral apparatus, 5 external storage apparatus, 6 wireless LAN interface unit, 7 I/O interface, 101 host interface unit, 102 data buffer, 103 central control unit, 104 beacon generating unit, 106 wireless transmission unit, 107 timing control unit, 109 antenna, 110 wireless reception unit, 112 beacon analyzing unit, 113 information storage unit

BEST MODE FOR CARRYING OUT THE INVENTION

An embodiment of the present invention will be described in detail with reference to the drawings.

A case is assumed with an embodiment described below wherein the propagation path of communication is wireless, and a single transmission medium (in the case that the link is not separated with frequency channels) is used to construct a network between multiple apparatuses. Note however, even in the case that there are multiple frequency channels as transmission media, the same description as above can be applied thereto. Also, the communication assumed in the following embodiment is a store-and-forward-switching traffic, where information is transferred in increments of packets. Also, the processing at each communication station described below is basically processing executed at all the communication stations to be participated in a network. However, all the communication stations making up the network do not necessarily execute the processing described below in some cases.

Figure 1:
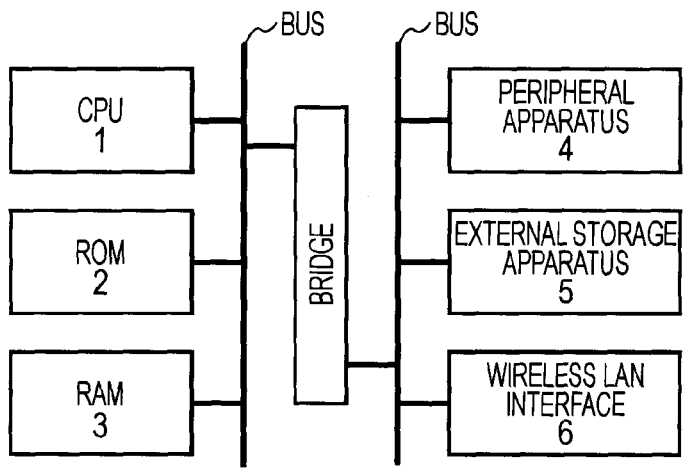
FIG. 1 is a diagram schematically illustrating the hardware configuration of a wireless apparatus capable of a communication operation with a wireless network according to the present invention.

FIG. 1 schematically illustrates the hardware configuration of a wireless apparatus capable of a communication operation with a wireless network according to the present invention. The wireless apparatus is information equipment in which a wireless LAN card is inserted such as a personal computer, or CE equipment such as a digital camera, music player, or the like.

With the wireless apparatus shown in the drawing, a CPU (Central Processing Unit) 1 is mutually connected to a memory apparatus such as ROM (Read Only Memory) 2, RAM (Random Access Memory) 3, or the like, a peripheral apparatus 4, an external storage apparatus 5 such as an HDD (Hard Disk Drive) or the like, and a peripheral apparatus such as a wireless LAN interface 6 or the like via a bus. Also, two or more buses are connected via a bridge apparatus.

The CPU 1 loads control code stored in the ROM 2, or program code installed in the external storage apparatus 5 onto the RAM 3, and executes this, thereby centrally controlling the operations of the whole apparatus, such as an apparatus operation using the peripheral apparatus 4 (e.g., a shooting or image playback operation at a digital camera, or a playlist display or music playback operation at a music player), a communication operation using the wireless LAN interface unit 6, and so forth.

Figure 2:
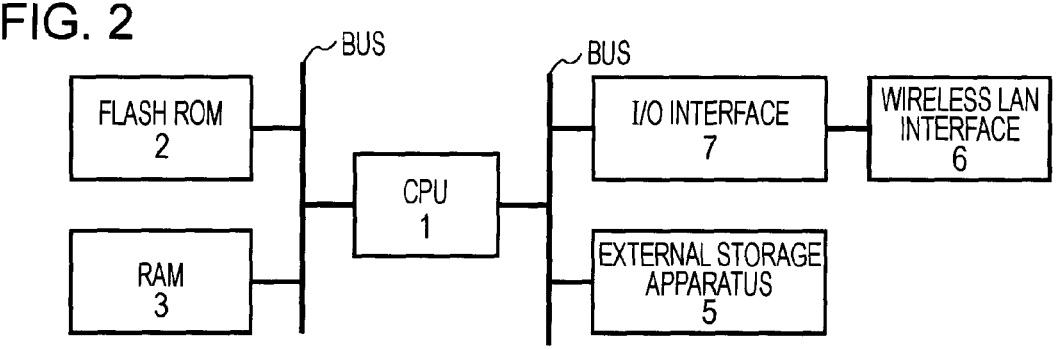
FIG. 2 is a diagram illustrating another configuration example of the wireless communication apparatus.

With the example shown in FIG. 1, the wireless LAN interface unit 6 passes the frame of the MAC (Media Access Control) layer of IEEE802.11 to the RAM 3 via the bus, and the processing of the MAC layer is executed at the CPU 1. However, the essence of the present invention is not restricted to the configuration of the wireless apparatus such as shown in FIG. 1, and other configurations, such as shown in FIG. 2, can be conceived. In FIG. 2, the wireless LAN interface unit 6 is connected to the bus via the I/O interface 7. As the I/O interface 7 which connects the wireless LAN interface unit 6 and the bus, MSIO (Memory Stick IO), SDIO (Secure Digital IO), USB (Universal Serial Bus), or the like is commonly used. The wireless interface unit 6 executes the processing of the MAC (Media Access Control) layer of IEEE802.11 to send a frame equivalent to IEEE802.3 to the host CPU 1 via the I/O interface 7.

The information equipment such as described in FIG. 1 and FIG. 2 can serve, for example, as a communication apparatus which operates on an Ad-hoc network by implementing the wireless interface unit 6. Also, with the information equipment such as shown in FIG. 1 and FIG. 2, a battery driven method is assumed wherein driving power is supplied from a battery (not shown), a battery charger configured to charge the battery thereof is provided, the remaining power thereof is obtained from the output terminal voltage or the like of the battery thereof, thereby controlling a charge operation by the battery charger.

Figure 3:
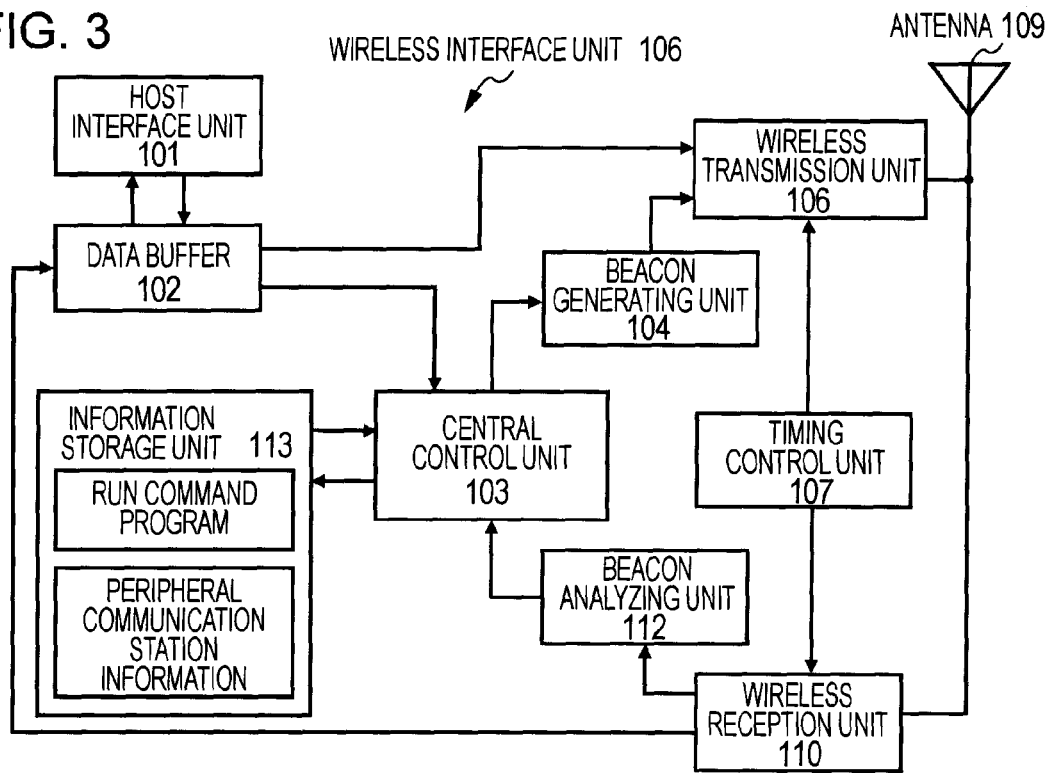
FIG. 3 is a diagram illustrating an internal configuration example of a wireless interface unit 6.

FIG. 3 illustrates the internal configuration example of the wireless interface unit 6. The wireless interface unit 6 shown in the drawing operates as a communication station under an autonomous distributed type communication environment where no control station is disposed, and channel access is executed effectively within the same wireless system, whereby a network can be formed while avoiding a collision.

As shown in the drawing, the wireless interface unit 6 serving as a communication station includes a host interface unit 101, a data buffer 102, a central control unit 103, a beacon generating unit 104, a wireless transmission unit 106, a timing control unit 107, an antenna 109, a wireless reception unit 110, a beacon analyzing unit 112, and an information storage unit 113.

The host interface unit 101 executes exchange of various types of information with host equipment (see FIG. 1 or FIG. 2) connected to the I/O interface 7.

The data buffer 102 is used for temporarily storing data sent from the host equipment connected via the host interface unit 101, or data received via the wireless transmission path before transmitting this via the host interface unit 101.

The central control unit 103 executes a predetermined execution command program, thereby centrally executing management of a series of information transmission and reception processing, and access control of the transmission path at the wireless interface unit 6 serving as a communication station.

With the present embodiment, the central control unit 103 executes processing to realize access control at an autonomous distributed type network such as an Ad-hoc mode, a mesh network, or the like, a power-saving operation of the self station, power-saving assistance at an adjacent station, or the like. Also, the access control mentioned here includes processing such as broadcast transfer of a route request message for multi-hop communication, or the like, a route setting taking into consideration a communication station which operates in a power-saving manner at the time of multi-hop communication, or the like. The details of these processes will be described later.

The beacon generating unit 104 generates a beacon signal to be exchanged periodically with a nearby communication station. In order for the wireless apparatus including the wireless interface unit 6 to be operated, the beacon transmission position of itself, the beacon reception position from an adjacent station, and so forth, are stipulated. These pieces of information are stored in the information storage unit 113, and are described in a beacon signal, and are annunciated to an adjacent communication station. Each communication station transmits a beacon at the top of a transmission frame cycle, and accordingly, the transmission frame cycle of a channel is defined with a beacon interval.

In order to wirelessly transmit data or a beacon signal temporarily stored in the data buffer 102, the wireless transmission unit 106 executes predetermined modulation processing. Also, the wireless reception unit 110 carries out reception processing of information or a signal such as a beacon or the like transmitted from another station at predetermined time.

As for the wireless transmission and reception methods of the wireless transmission unit 106 and the wireless reception unit 110, various types of communication method adaptable to a wireless LAN, suitable for relatively short-distance communication can be employed, for example. Specifically, the UWB (Ultra Wide Band) method, OFDM (Orthogonal Frequency Division Multiplexing) method, CDMA (Code Division Multiple Access) method, or the like can be employed.

The antenna 109 wirelessly transmits a signal addressed to another communication station on a predetermined frequency channel, or collects a signal transmitted from another communication station. With the present embodiment, let us say that a single antenna shared by the transmitter and the receiver is provided, and this antenna is incapable of transmission and reception simultaneously in parallel.

The timing control unit 107 executes control of timing for transmitting or receiving a wireless signal. For example, the timing control unit 107 controls the beacon transmission timing of itself at the top of a transmission frame cycle, the beacon reception timing from an adjacent station, data transmission/reception timing with an adjacent station, a scan operation cycle, and so forth.

The beacon analyzing unit 112 analyzes a beacon signal which has been able to be received from an adjacent station, and analyzes the presence of the adjacent station, or the like. For example, the information of an adjacent station to be extracted from a beacon signal such as a TBTT or like is stored in the information storage unit 113 as adjacent apparatus information.

The information storage unit 113 stores an execution procedure command such as a series of access control operations (a program in which a collision avoidance processing procedure or the like is described) to be executed at the central control unit 103, the adjacent apparatus information to be obtained from the analysis results of a received beacon, and so forth.

With the present invention, the wireless apparatus including the wireless interface unit 6 operates as a communication station to participate in an autonomous distributed type network such as an Ad-hoc mode, a mesh network, or the like. Such a communication station has features wherein, even in the case that a part of communication stations which have participated in the same communication station execute a power-saving operation, a communication operation can be executed suitably. Specifically, such a communication station solves a data transfer latency problem at the time of executing broadcast transfer, determines suitably whether to set a communication station which operates in a power-saving manner at the time of multi-hop communication as a relay station, and sets a route with less delay, whereby a mesh network can be configured. These processing operations will be described below in detail.

Figure 4:
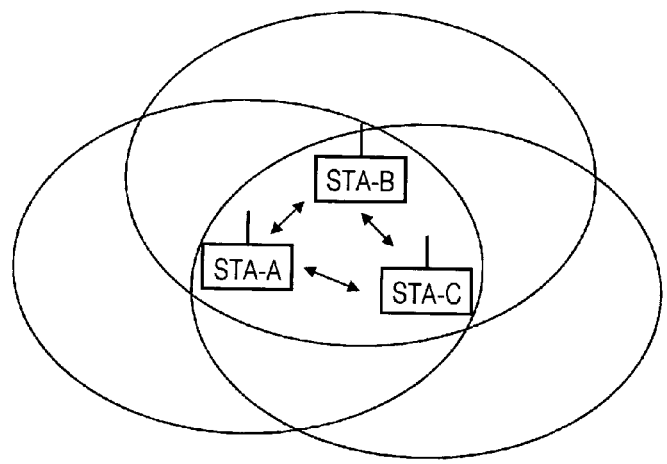
FIG. 4 is a diagram illustrating a network configuration example assumed for describing an embodiment of the present invention.

A. Transmission Procedure of Broadcast Traffic at Power-Saving Assistance Stations First, the transmission procedure of broadcast traffic will be described with reference to FIG. 4. However, now, let us say that as the attributes of communication stations, a capability to execute data transfer through a predetermined procedure as to a communication station under the sleep mode which repeats a Doze state and an Awake state alternately, i.e., "power-saving assistance" has been stipulated.

The network shown in the drawing is configured of three communication stations, and a situation is assumed wherein STA-A is a power-saving assistance station, and now attempts to transmit a broadcast traffic to STA-B and STA-C, but the STA-C which has entered into the sleep mode. Note that the STA-B might also have entered into the sleep mode, but in order to simplify explanation, let us say that the STA-B is in the active mode.

With networking following IEEE802.11, at the time of transmitting broadcast data to multiple communication stations in a broadcast manner, an AP or power-saving assistance station buffers the transmission data internally when at least a part of the destination stations are under the sleep mode, and transmits this data immediately after transmitting a beacon.

Figure 5:
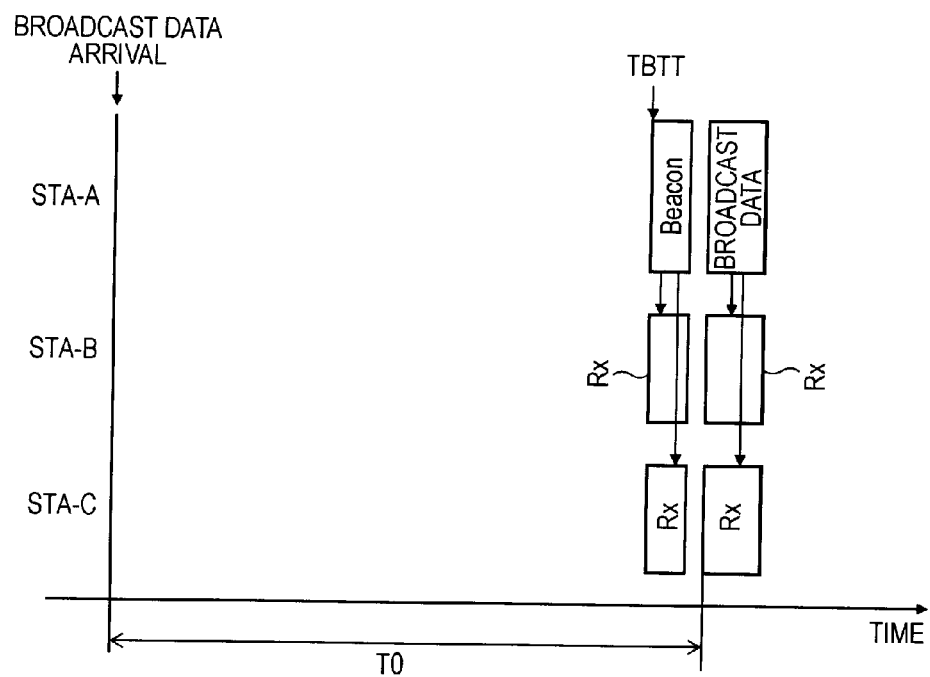
FIG. 5 is a diagram illustrating an example (conventional example) of a procedure arranged to transmit a broadcast traffic with the network shown in FIG. 4.

FIG. 5 illustrates a transmission procedure in this case. Even if broadcast traffic data arrived at the STA-A, the STA-C which is one of the communication partners is operating under the sleep mode, and accordingly, the STA-A has difficulty in transmitting this traffic immediately. Consequently, the STA-A holds this data in the buffer until the TBTT (of the STA-A) when the STA-C operates the receiver, and executes transmission of this broadcast data after executing transmission of a beacon. Therefore, as shown in the drawing, delay of only T0 occurs in distribution of this data.

In order to avoid such a problem, with the present invention, a communication station which intends to transmit a broadcast traffic is configured to transmit broadcast data multiple times. Specifically, upon broadcast traffic data arriving at the STA-A, the STA-A activates a procedure to distribute this broadcast traffic data for each of adjacent communication stations (i.e., each time each communication station enters into an Awake state), and generates two data packets (the contents of these are the same).

Figure 6:
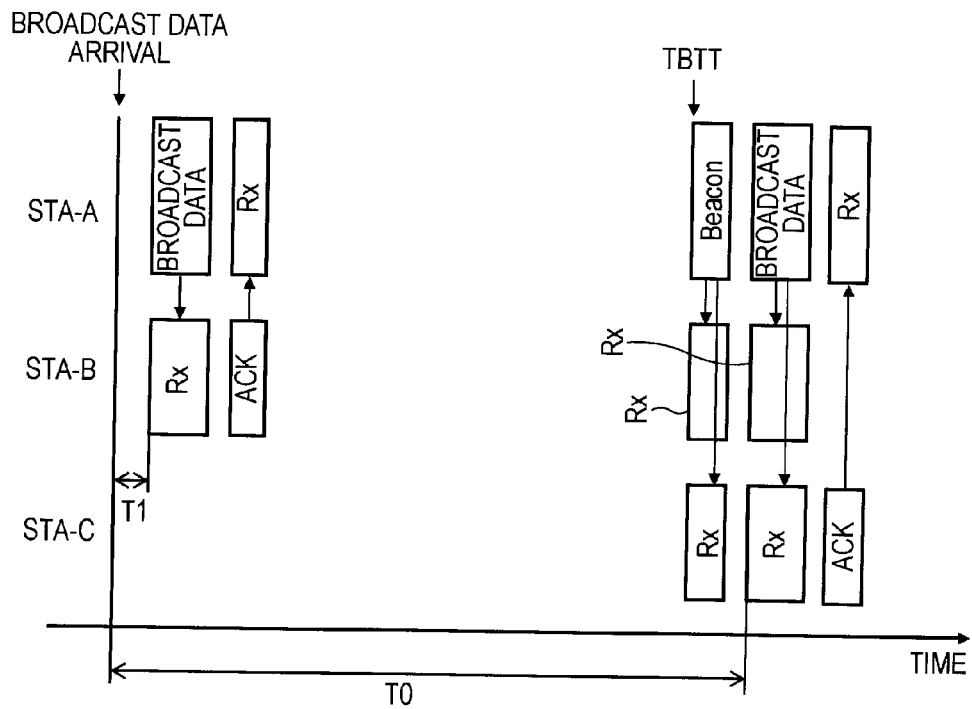
FIG. 6 is a diagram illustrating a transmission procedure of a broadcast traffic according to the present invention with the network shown in FIG. 4.

FIG. 6 illustrates a broadcast traffic transmission procedure in this case. First, the STA-A immediately transmits broadcast data to the STA-B which is operating under the active mode, and further thereafter, executes transmission of a beacon at the TBTT when the STA-C operates the receiver, and then transmits the broadcast data to the STA-C. Thus, the broadcast data can be distributed to the STA-B which is operating under the active mode with the minimum delay (delay quantity shown in T1 with the example shown in FIG. 6), and on the other hand, the broadcast data is distributed surely to the STA-C which is operating under the sleep mode while generating a delay quantity of only T0. That is to say, the STA-A serving as a power-saving assistance station has done its best regarding distribution delay.

Also, it is desirable that the STA-A serving as a power-saving assistance station has annunciated an adjacent station of communication station attribute information regarding whether to activate a procedure for transmitting a broadcast traffic multiple times, beforehand. Hereinafter, a communication station attribute wherein the same broadcast data is transmitted multiple times in sync with timing when each of the destination stations enters into an Awake state will be referred to as "low-delay broadcast distribution".

Figure 7:
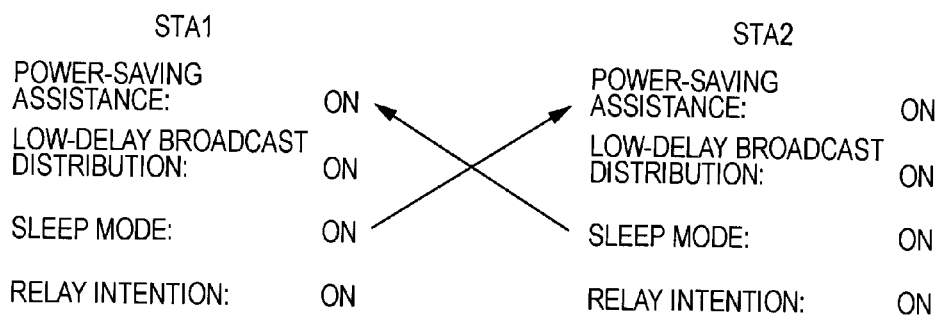
FIG. 7 is a diagram illustrating an example wherein matching of communication station attributes is executed.
Figure 22:
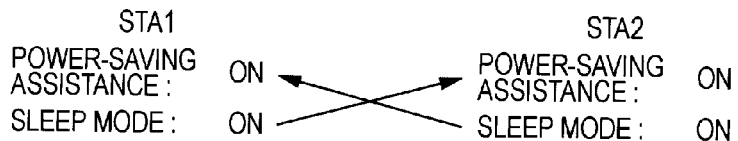
FIG. 22 is a diagram illustrating a situation wherein matching of attributes is executed between the communication stations STA1 and STA2 which execute data communication.
Figure 23:
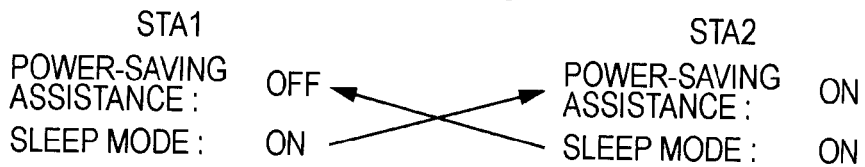
FIG. 23 is a diagram illustrating a situation wherein matching of attributes is executed between the communication stations STA1 and STA2 which execute data communication.
Figure 24:
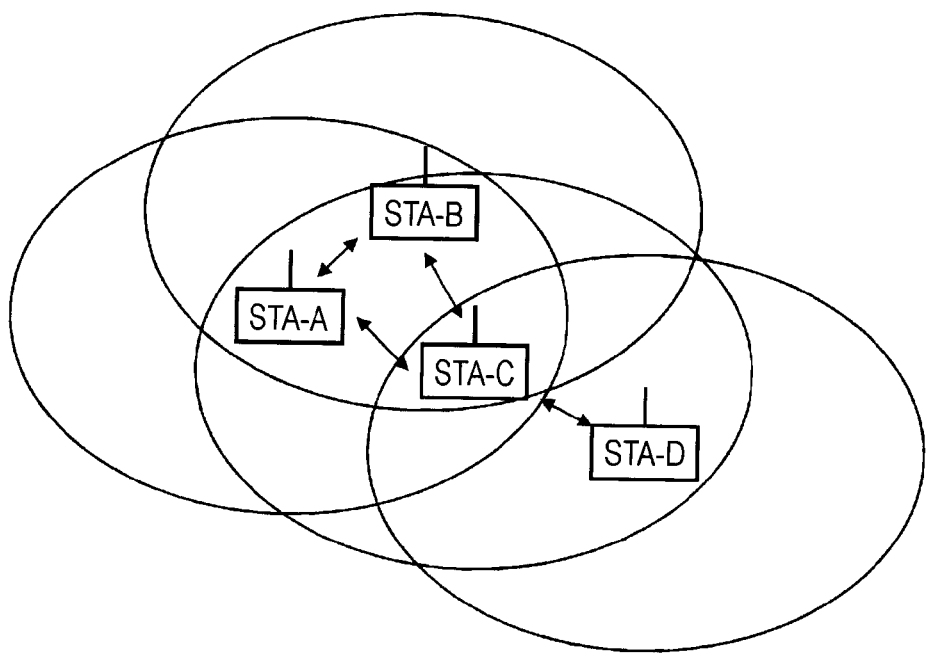
FIG. 24 is a diagram for describing a route setting procedure used for executing multi-hop communication.

The methodology has already been described wherein, with an autonomous distributed type communication system, information indicating an attribute is notified mutually between communication stations, and matching of mutual communication station attributes is taken, thereby determining whether or not there is communicable relationship beforehand. FIG. 7 illustrates an example wherein matching of communication station attributes is executed. In addition to the "power-saving assistance" information shown in FIG. 22 and FIG. 23, information regarding whether or not there is the "low-delay broadcast distribution" function is included in a beacon signal, whereby this annunciation can be executed, and matching can be executed between communication stations. Alternatively, an arrangement may be made wherein annunciation of the "low-delay broadcast distribution" function is separately transmitted and received between peripheral communication stations as control data without describing the annunciation of the "low-delay broadcast distribution" function in a beacon signal, thereby exchanging the attribute information.

Thus, a power-saving assistance station has annunciated thereabout of the "low-delay broadcast distribution" function, whereby an adjacent station which is operating under the sleep mode can determine whether to enter into a communication state with this communication station (or whether to enter into a communication state after proceeding to the active mode).

For example, an arrangement may be made wherein, when finding out the STA-A thereabout, in the case that the STA-A does not have the "low-delay broadcast distribution" function, the STA-C under the sleep mode worries about that distribution of broadcast data will be delayed due to the sleep mode of the self station, and selects not to enter into a communication state with this communication station. Similarly, a communication station having no "low-delay broadcast distribution" function may select not to enter into a communication state with a communication station which operates under the power-saving mode.

Figure 8:
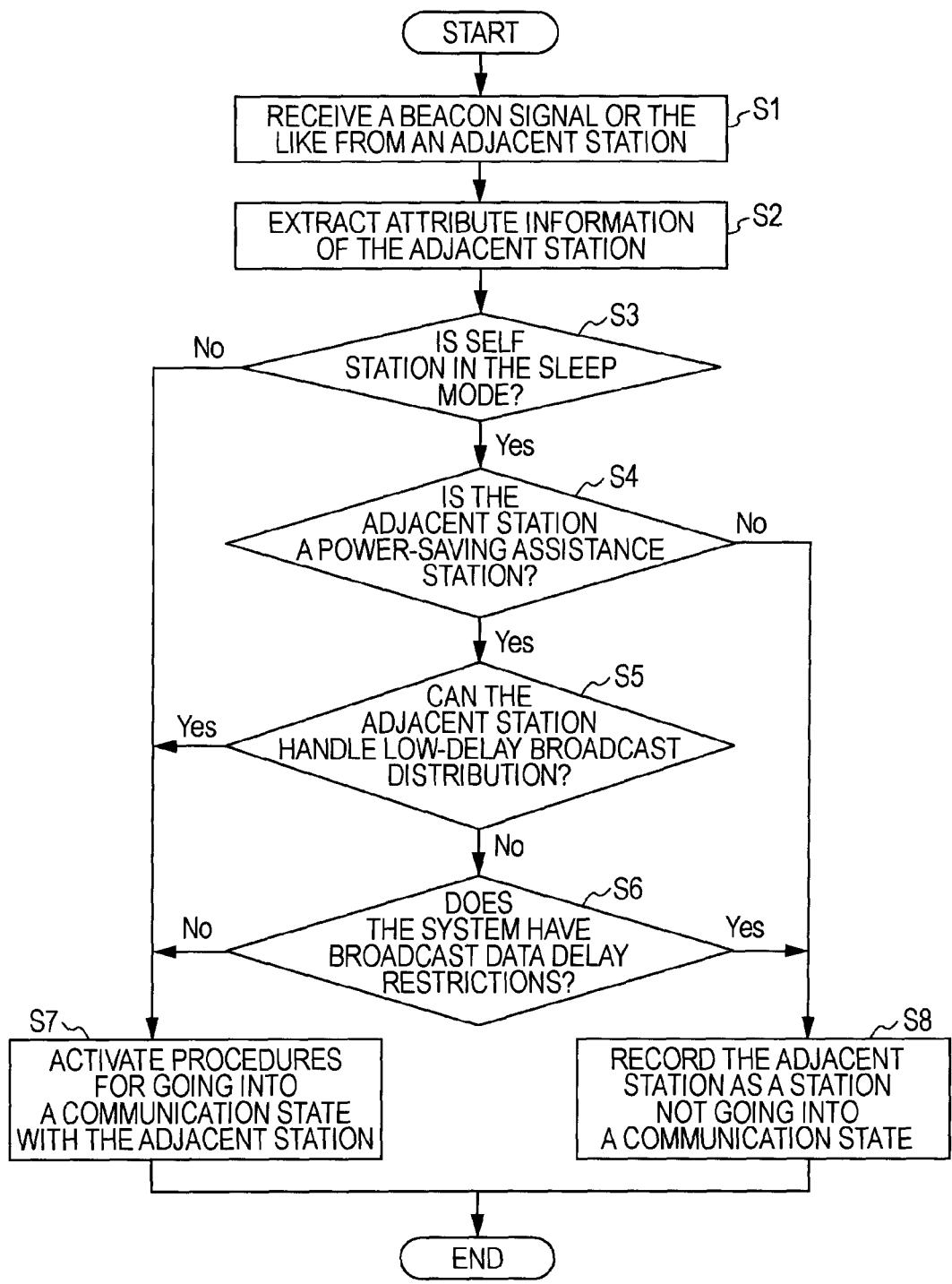
FIG. 8 is a flowchart illustrating a processing procedure arranged to determine, at the time of a communication station finding an adjacent station by receiving a beacon signal, whether to enter into a communication state with this adjacent station.

FIG. 8 illustrates, in a flowchart format, a processing procedure for determining, at the time of a communication station finding out an adjacent station by receiving a beacon signal, whether to enter into a communication state with this adjacent station.

Upon receiving a beacon signal (or the other frame including information relating to communication station attributes) from the adjacent station (step S1), the communication station analyzes the beacon signal thereof to extract information relating to communication station attributes including "power-saving assistance" and "low-delay broadcast distribution" (step S2). The extracted information is stored in the information storage unit 113 as adjacent communication apparatus information.

Next, the communication station determines whether or not the self station is now operating under the sleep mode (step S3).

Here, when the communication station is not under the sleep mode, i.e., is under the active mode (No in step S3), there is no failure even when entering into a communication state with the adjacent station serving as a transmission source of the beacon signal, the communication station activates a procedure for entering into a communication state with this adjacent station (step S7).

On the other hand, when the communication station is under the sleep mode (Yes in step S3), based on the attributes of the adjacent station obtained from the beacon signal or the like, the communication station fully examines whether or not the communication station can enter into a communication state with this adjacent station.

First, the communication station determines whether or not the adjacent station serving as a transmission source of the beacon signal is a power-saving assistance station (step S4). Here, when the adjacent station is not a power-saving assistance station (No in step S4), there are concerns that great delay may occur at the time of distribution of broadcast data, or communication may stop, and accordingly, the communication station determines that the adjacent station is a station not to enter into a communication state, and stores such information in the information storage unit 113 as adjacent communication apparatus information (step S8).

Also, in the case that the adjacent station is a power-saving assistance station (Yes in step S4), the communication station further determines whether or not the adjacent station has the low-delay broadcast distribution function (step S5).

When the adjacent station is a power-saving assistance station, and also has the low-delay broadcast distribution function (Yes in step S5), the adjacent station transmits the same broadcast data multiple times in sync with the timing when each of the destination stations enters into an Awake state, whereby distribution delay can be suppressed. That is to say, there is no failure even when entering into a communication state with the adjacent station, and accordingly, the communication station activates a procedure for entering into a communication state with this adjacent station (step S7).

Even when the adjacent station is a power-saving assistance station, in the case that the adjacent station has no low-delay broadcast distribution function (No in step S5), there is a concern that distribution of broadcast data may be greatly delayed due to the sleep mode of the self station. In this case, the communication station further determines whether or not restrictions relating to distribution delay of broadcast data are imposed on the communication system.

When restrictions relating to distribution delay of broadcast data are not imposed on the communication system (No in step S6), there is no failure even when entering into a communication state with the adjacent station, and accordingly, the communication station activates a procedure for entering into a communication state with this adjacent station (step S7).

Conversely, when restrictions relating to distribution delay of broadcast data are imposed on the communication system (Yes in step S6), there is a concern that distribution of broadcast data may be delayed due to the sleep mode of the self station, and the restrictions may not be protected. Therefore, the communication station determines that the adjacent station is a station not to enter into a communication state, and stores such information in the information storage unit 113 as adjacent communication apparatus information (step S8).

B. Relay Intention at Communication Station Under Sleep Mode

At the time of executing multi-hop communication wherein multiple communication stations transmit frames by relay, upon a communication station under the sleep mode being set as a relay station, a problem is caused wherein data is buffered at the front communication station on the route, and accordingly, great delay may occur in data transfer, or the communication station may have difficulty in proceeding to a Doze state to fulfill a relay station function in spite of the communication station being under the sleep mode, i.e., may have difficulty in realizing power saving.

Therefore, with the communication system according to the present invention, a communication station is configured to eliminate a data transfer delay problem by declaring intention as to an adjacent station regarding whether or not the self station may become a relay station, and to execute setting of a route while taking the power consumption of each station serving as a relay candidate.

As shown in FIG. 7, relay intention is included in a beacon signal or the like as attribute information to be exchanged between communication stations. Alternatively, annunciation of relay intention may be transmitted or received with an adjacent station separately as control data without being described in a beacon signal, thereby exchanging attribute information. Subsequently, at the time of determining whether to enter into a communication state with the adjacent station, matching of communication station attributes taking into consideration relay intention can be executed.

Each of communication stations has confirmed the "relay intention" of a peripheral communication station beforehand, and subsequently, determines, at the time of transferring control data relating to a route setting for multi-hop communication, whether to transfer this control data to each of the peripheral communication stations according to the presence/absence of relay intention confirmed beforehand.

Figure 25:
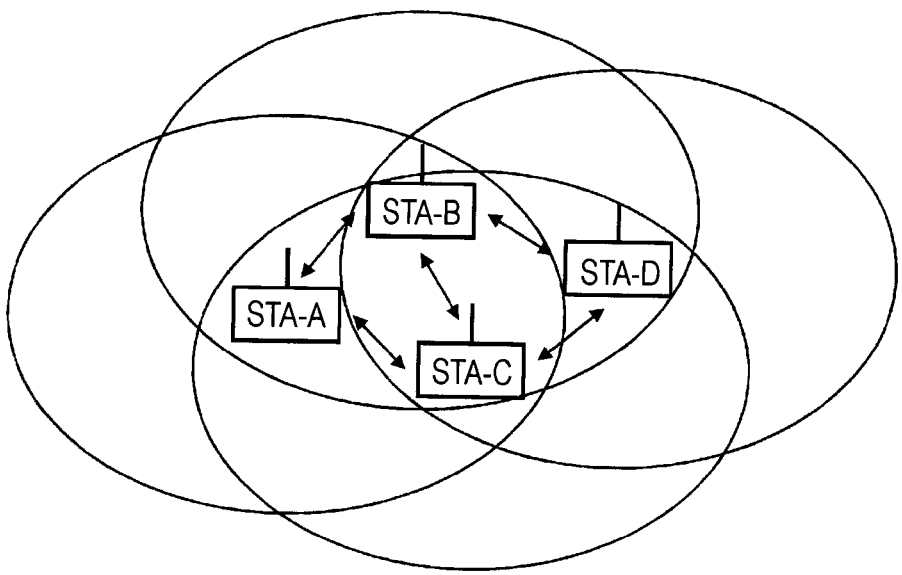
FIG. 25 is a diagram for describing a route setting procedure used for executing multi-hop communication.

Now, as shown in FIG. 25, let us assume a case where there are four communication stations STA-A through STA-D, and multi-hop communication is executed between the STA-A and the STA-D. The STA-B and STA-C become relay candidate stations. However, the STA-B is in the active mode, and the STA-C has entered into the sleep mode. Let us say that the STA-C proceeds to the sleep mode on the assumption that the communication stations such as the STA-A and STA-B adjacent to the STA-C support a power-saving assistance function, and further, the STA-A supports the above low-delay broadcast distribution function. Further, now, let us say that it has annunciated that the STA-C has no relay intention, and the STA-A has known this fact beforehand.

Figure 9:
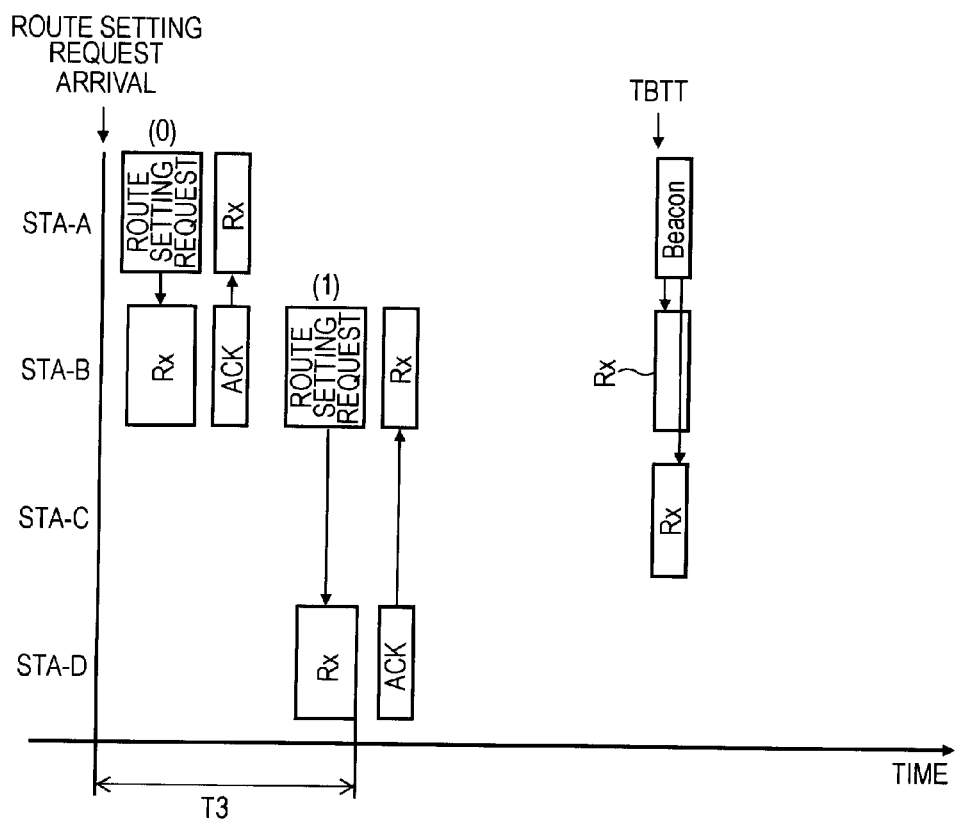
FIG. 9 is a diagram illustrating an example of a data distribution procedure arranged to execute setting of a route while taking into consideration that a relay candidate station has no relay intention under the communication environment shown in FIG. 25.

FIG. 9 illustrates, in such a case, an example of a data distribution procedure for executing setting of a route with the STA-A as the starting point. The STA-A has the above low-delay broadcast distribution function, and can transmit a route setting request multiple times.

In the drawing, upon a route setting request occurring, the STA-A immediately transmits the control data of the route setting request to the STA-B which is in the active mode (packet (0) in the drawing). Further, the STA-B immediately transfers the control data of the route setting request received from the STA-A to the STA-D (packet (1) in the drawing).

Therefore, the STA-A can distribute the control data of the route setting request with less delay quantity T3 as to the STA-D serving as a desired destination station. Moreover, the STA-A does not transmit the control data of the route setting request to the STA-C having no relay intention wastefully, i.e., execution of wasteful transmission and reception can be prevented.

Next, with a communication station layout similar to that shown in FIG. 25, let us consider the case of assuming that the STA-C has annunciated that the STA-C has relay intention, and the STA-A has already known this fact. However, the STA-B is in the active mode, and the STA-C has entered into the sleep mode (let us say that the STA-C proceeds to the sleep mode on the assumption that the communication stations such as the STA-A and STA-B adjacent to the STA-C support a power-saving assistance function) (similar to the above).

Figure 10:
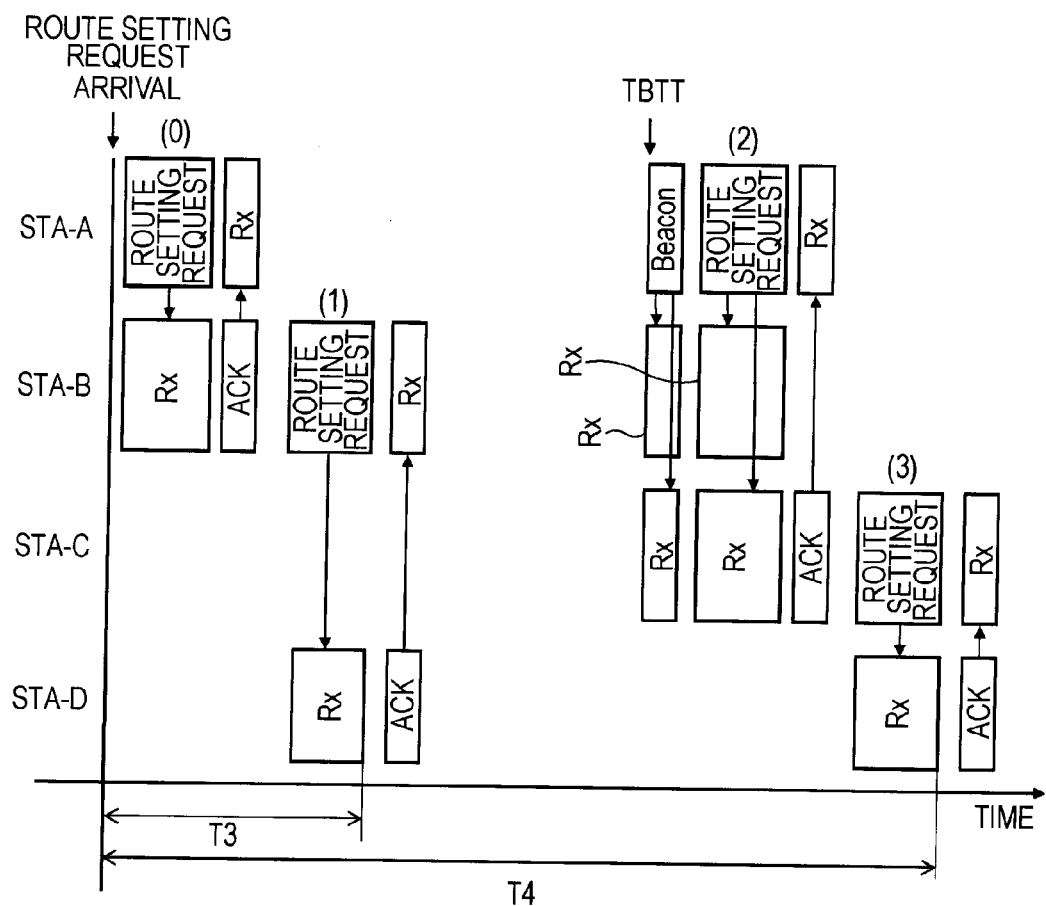
FIG. 10 is a diagram illustrating an example of a data distribution procedure arranged to execute setting of a route while taking into consideration that a relay candidate station has relay intention under the communication environment shown in FIG. 25.

FIG. 10 illustrates an example of a data distribution procedure for executing a route setting in such a case.

In the drawing, upon a route setting request occurring, the STA-A immediately transmits the control data of the route setting request to the STA-B which is in the active mode (packet (0) in the drawing). Further, the STA-A attempts to transmit the same control data to the adjacent STA-C, but the STA-C is in a Doze state under the sleep mode, and accordingly, transmission of this data is postponed to the next TBTT and thereafter.

The STA-B immediately transfers the control data of the route setting request received from the STA-A (packet (0) in the drawing) to the STA-D (packet (1) in the drawing). Accordingly, the STA-A can distribute the control data of the route setting request with less delay quantity T3 as to the STA-D serving as a desired destination station.

On the other hand, as described above, the STA-A transmits the control data of the route setting request (packet (2) in the drawing) to the STA-C which has declared relay intention at a time zone where the STA-C is in a reception state (i.e., the next TBTT). Subsequently, the STA-C immediately transfers the control data of the route setting request received from the STA-A to the STA-D (packet (3) in the drawing). Accordingly, the control data of the route setting request is distributed to the STA-D serving as a desired destination station with greater delay quantity T4 than the T3.

With the data distribution procedure shown in FIG. 10, a plurality of route setting data arrive at the STA-D serving as a route destination station, caused by the relay candidate station STA-C under the sleep mode declaring relay intention. In such a case, the destination station STA-D is configured so as not to select a route where the route setting data arrived late (or so as to select a route where the route setting data arrived earliest), whereby control can be executed so as not to select a route including a communication station under that sleep mode as a relay station. Also, in the case that there is only a route where a communication station under the sleep mode is included as a relay station, the route thereof is selected. Even in the case that the route setting request data transmitted from the STA-A is received at the STA-D via multiple routes, in the case that there is no great difference in route metric values between packets, the processing is executed so as to select a route received earliest.

Note that the route metric value is a scale indicating the quality of a route or the like, and is represented with information accumulated so far from a route source station, commonly, such as the number of hops, data rate, data rate×(1−packet error rate), or statistical data combined from these, or the like.

Figure 11:
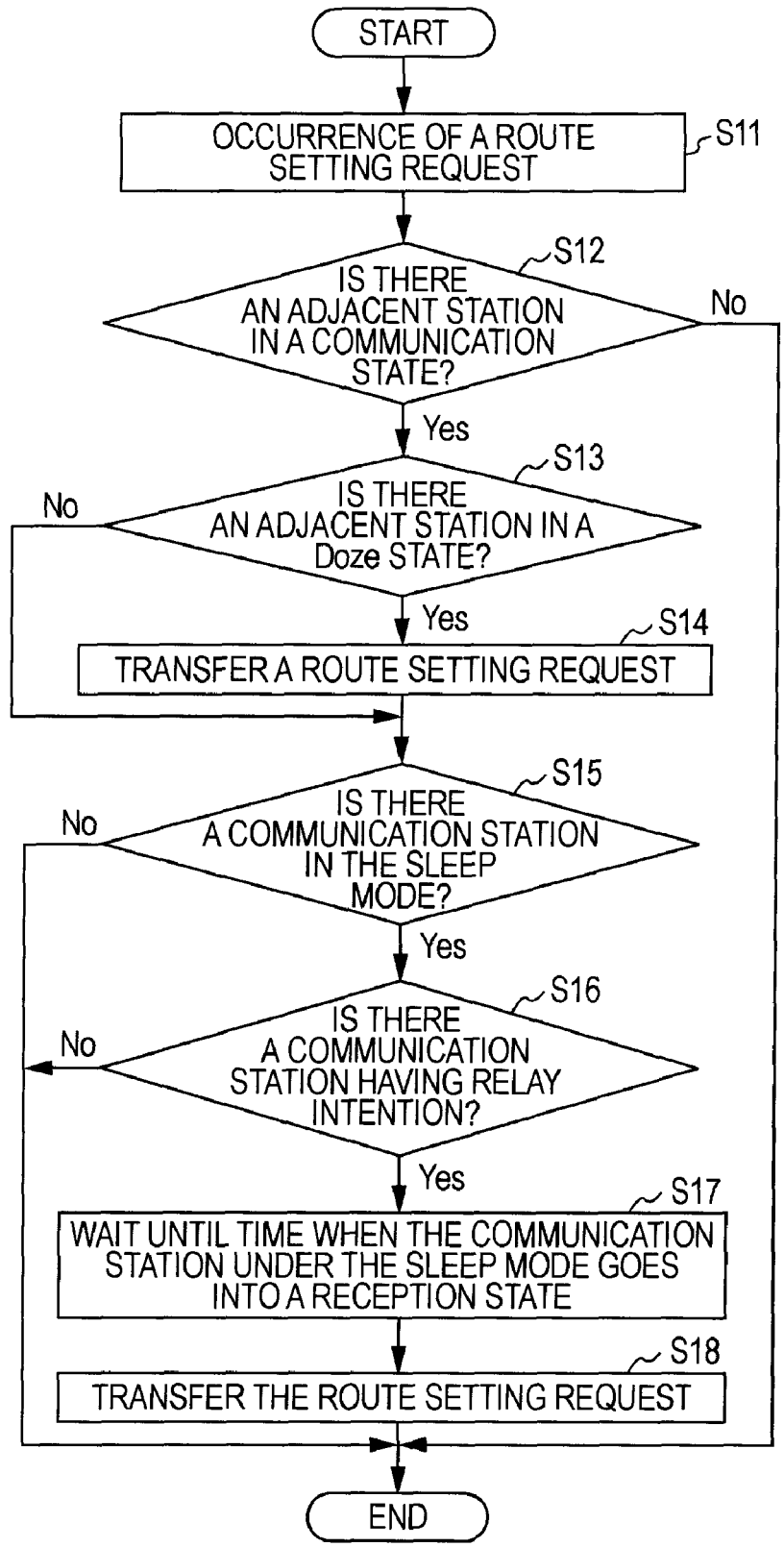
FIG. 11 is a flowchart illustrating a processing procedure used for a communication station transmitting a route setting request (or broadcast data).

FIG. 11 illustrates a processing procedure for a communication station transmitting a route setting request (or broadcast data) in a flowchart format. However, let us say that a communication station which issues a route setting request supports a power-saving assistance function, and recognizes whether or not an adjacent station is under the sleep mode, and timing when each adjacent station under the sleep mode enters into an Awake state. With the data distribution procedures shown in FIG. 9 and FIG. 10, at the time of the STA-A executing a route setting request for carrying out multi-hop communication with the STA-D, this processing procedure should be executed.

Upon a route setting request occurring at a communication station (step S11), the communication station references the adjacent communication apparatus information within the information storage unit 113 to confirm an adjacent station which is now in a communication state (step S12). Here, in the case that there is no adjacent station in a communication state (No in step S12), the communication station skips all the subsequent processing steps, and ends this processing routine.

On the other hand, in the case that there is an adjacent station which is in a communication state (Yes in step S12), further of the adjacent stations which are in a communication state, the communication station extracts adjacent stations of which the receivers are in an Awake state (step S13). Subsequently, the communication station immediately transmits the control data of the route setting request to the adjacent stations of which the receivers are in an Awake state in a broadcast manner (step S14).

The communication stations of which the receivers are in an Awake state include a communication station which is under the active mode (i.e., not under the sleep mode), and a communication station which is under the sleep mode, but is now in an Awake state. A communication station serving as a power-saving assistance station recognizes these states regarding adjacent stations through preliminary exchange of attribute information such as a beacon signal.

Also, of the adjacent stations which are in a communication state, when there is an adjacent station which is now in a Doze state (No in step S13), confirmation is made that the adjacent station thereof is operating under the sleep mode (Yes in step S15), following which determination is further made whether or not the adjacent station thereof is a communication station which has declared relay intention (step S16).

Here, when the communication station which is under the sleep mode has no relay intention (No in step S16), the communication station thereof does not become a relay station candidate, and accordingly, all the following processing steps are skipped, and this processing routine is ended. In this case, the control data of the route setting request is not transmitted wastefully to the adjacent station having no relay intention, i.e., execution of wasteful transmission and reception can be prevented.

On the other hand, when the communication station which is under sleep mode has relay intention (Yes in step S16), the communication station thereof can become a relay candidate station. Accordingly, after waiting until the time when the relay candidate station enters into a reception state (e.g., the next TBTT) (step S17), the control data of the route setting request is transmitted (step S18). In this case, there are two or more routes including a route not relayed by a power-saving communication station, and a route relayed by a power-saving communication station, and accordingly, there is a possibility that two or more pieces of route setting data may arrive at a route destination station.

Figure 12:
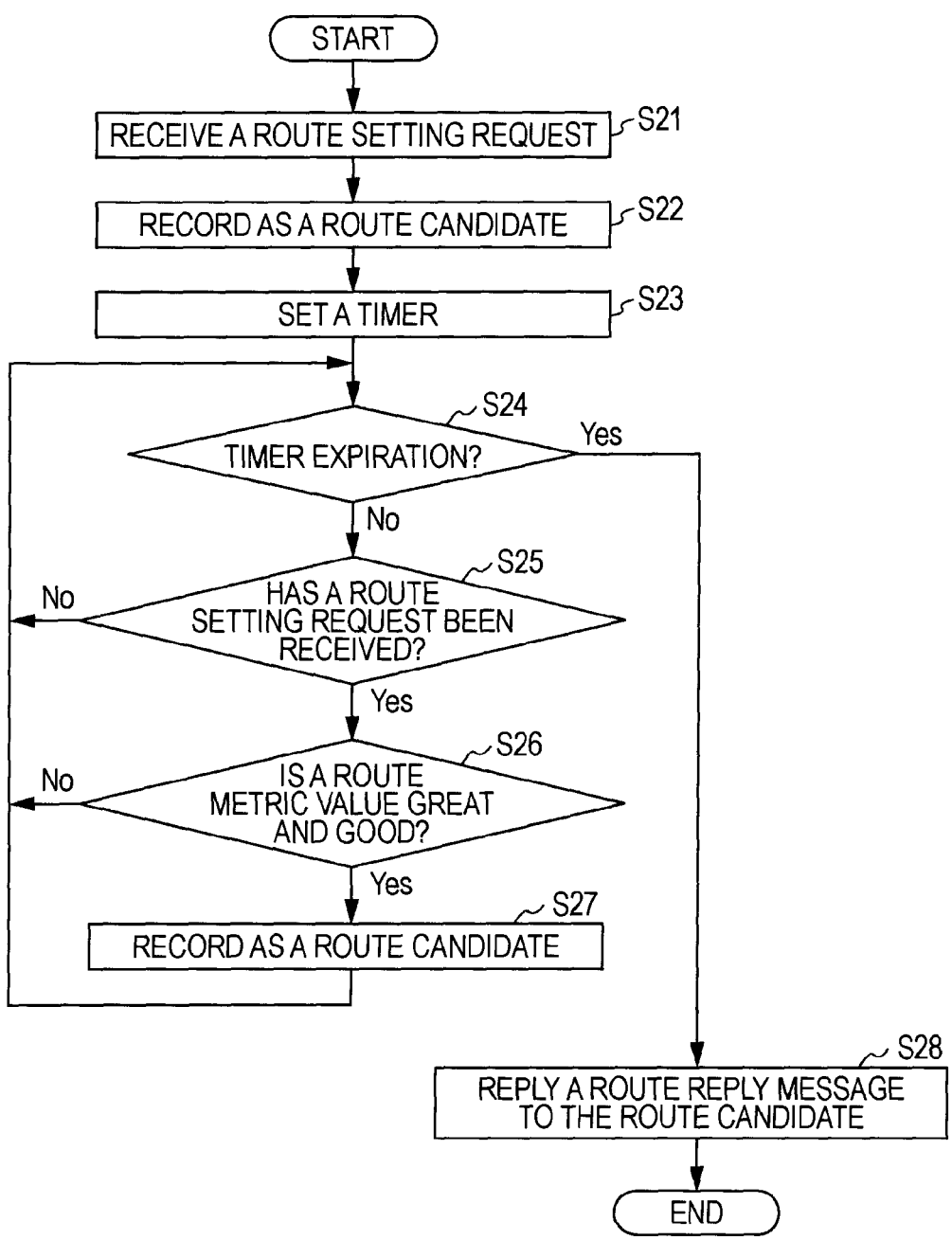
FIG. 12 is a flowchart illustrating a processing procedure that a communication station serving as a route destination executes at the time of receiving a route setting request.

Also, FIG. 12 illustrates a processing procedure that a communication station serving as a route destination executes at the time of receiving a route setting request, in a flowchart format. With the data distribution procedures shown in FIG. 9 and FIG. 10, the STA-D serving as a route destination station should execute this processing procedure at the time of receiving a route setting request from the STA-A via one or more routes.

Upon receiving the control data of the route setting request addressed to the self station (step S21), the route destination station analyzes the control data to extract necessary data such as the route information and route metric information and so forth from the request source, and records this as a route candidate (step S22).

Subsequently, the route destination station sets the timer (step S23), and waits for reception of a route setting request to be arrived via another route (step S25) until the timer thereof expires (No in step S24). Subsequently, whenever a route setting request is received (Yes in step S25), the route metric value thereof is compared to that of the already received route setting request (step S26), and the route candidate is replaced with a route candidate having a good route metric value (step S27).

Subsequently, upon the timer expiring (Yes in step S24), the route destination station replies a route reply message to the relay station serving as the route candidate (step S28).

Note that even in the case that both of the STA-A serving as a route setting request source and the relay candidate station STA-C which is under the sleep mode transferred the control data of the route setting request without taking into consideration "relay intention", the route destination station STA-D can execute the processing procedure shown in FIG. 12 to execute an effective route setting based on the determination of the self station.

Also, though the STA-C which is a communication station under the sleep mode has relay intention, there is a concern that data distribution may be delayed, and accordingly, a bias value may be added to the route metric value within a route setting request packet RREQ to be transferred so as to prevent the self station from being selected as a relay station. In such a case, the route destination station STA-D recognizes that a route including the STA-C as a relay station is a high cost, another route not including the communication station STA-C which is under the sleep mode as a relay station can be selected. An operation to add a bias value to a route metric value is equivalent to an operation wherein in the case that there is a route not including a communication station which is under the sleep mode as a relay station, weighting is executed so as to select this route. Also, in the case that there is only a route including a communication station which is under the sleep mode as a relay station, this route is selected.

Figure 13:
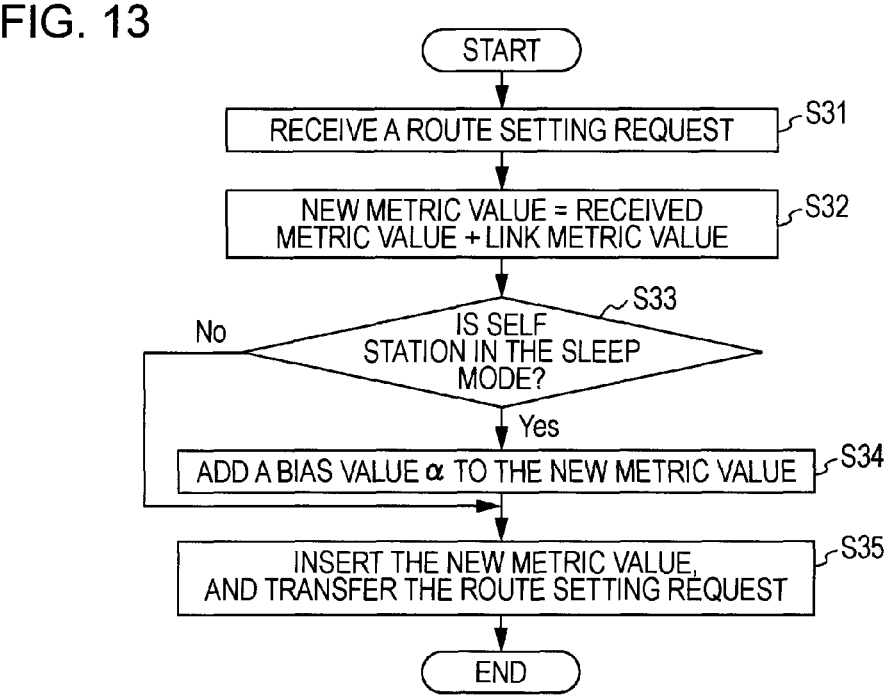
FIG. 13 is a flowchart illustrating a processing procedure used for a communication station serving as a relay candidate station adding a bias value to a route metric value according to whether or not the self station is under a sleep mode at the time of receiving route setting request data.

FIG. 13 illustrates a processing procedure for adding a bias value to a route metric value according to whether or not the self station is under the sleep mode at the time of a communication station serving as a relay candidate station having received route setting request data, in a flowchart format. Such a processing procedure should be executed in the case that a communication station which is under the sleep mode has declared relay intention, and in the case that the communication station thereof has no relay intention, route setting request data does not arrive, and accordingly, such a procedure is unnecessary. Also, in the case that route setting request data not addressed to the self station has been arrived without having no relay intention, the communication station discards this request data as if nothing had happened. For example, with the data distribution procedure shown in FIG. 10, when the relay candidate stations STA-B and STA-C received a route setting request from the STA-A, this processing procedure should be executed (however, let us say that the STA-C has declared relay intention, or the STA-A transmitted the route setting request without taking into consideration the relay intention of the STA-C).

Upon receiving the control data of the route setting request not addressed to the self station (step S31), the communication station updates the route metric value included in the control data thereof (step S32). The calculation method of the route metric value is not restricted to a particular method, but the route metric value is updated here by adding a link metric value to the received metric value.

Next, the communication station determines whether or not the self station is now under the sleep mode (step S33).

Here, in the case that the communication station is not under the sleep mode (No in step S33), i.e., is under the active mode, the control data of the received route setting request can be transferred to an adjacent station immediately, and there is no worry that data distribution may be delayed even if the self station becomes a relay station. That is to say, there is no need to add a bias value to the route metric value, and accordingly, the route metric value updated in step S32 is described in the route setting request, and the route setting request thereof is transferred to the adjacent station (step S35).

On the other hand, in the case that the communication station is under the sleep mode (Yes in step S33), the self station is included in the route, and accordingly, there is a concern that data distribution may be delayed. Therefore, a bias value $\alpha$ is added to the route metric value updated in step S32 (step S34), the route metric value thereof is described in the route setting request, and the route setting request thereof is transferred to the adjacent station (step S35).

C. Attribute Information to be Exchanged Between Communication Stations

With the communication system according to the present invention, in order to solve a data transfer latency problem at the time of executing broadcast transfer, and to suitably determine whether or not a communication station which operates in a power-saving manner at the time of multi-hop communication is set to a relay station, mutual attribute information is exchanged preliminarily between adjacent communication stations. The attributes of a communication station to be used regarding a power-saving operation, a route setting, and control of a relay station are summarized in the following table.

TABLE 1

| COMMUNICATION STATION ATTRIBUTES | EXPLANATION |
| --- | --- |
| (A) POWER-SAVING ASSISTANCE | INDICATES WHETHER CAPABLE OF COMMUNICATING WITH A COMMUNICATION STATION IN THE POWER-SAVING MODE |
| (B) LOW-DELAY BROADCAST DISTRIBUTION | INDICATES WHETHER HAVING A FUNCTION TO DISTRIBUTE BROADCAST DATA WITH LOW-DELAY |
| (C) POWER-SAVING MODE | INDICATES WHETHER OR NOT THE SELF STATION OPERATES IN THE POWER-SAVING MODE |
| (D) RELAY INTENTION | INDICATES INTENTION TO OPERATE AS A RELAY STATION AT THE TIME OF THE POWER-SAVING MODE |

Of the communication station attributes shown in the above Table 1, (A) power-saving assistance and (B) low-delay broadcast distribution are attributes relating to a communication station having a power-saving assistance communication function, and the ON/OFF combinations of these attributes (presence/absence of equipped functions) have meanings such as shown in the following table. In other words, the communication stations can determine properties relating to power-saving assistance by referencing the combinations of the attributes (A) and (B) of a partner station.

TABLE 2

| (A) POWER-SAVING ASSISTANCE | (B) LOW-DELAY BROADCAST DISTRIBUTION | MEANINGS |
| --- | --- | --- |
| OFF | OFF | THIS COMMUNICATION STATION IS NOT CAPABLE OF COMMUNICATING WITH A COMMUNICATION STATION IN THE POWER-SAVING MODE. THIS COMMUNICATION STATION DOES NOT ENTER INTO A COMMUNICATION STATE WITH A COMMUNICATION STATION WHICH OPERATES IN THE POWER-SAVING MODE. |
| OFF | ON | N/A |
| ON | OFF | THIS COMMUNICATION STATION IS COMPATIBLE WITH THE COMMUNICATION OF A COMMUNICATION STATION IN THE POWER-SAVING MODE, BUT THERE IS A POSSIBILITY THAT DISTRIBUTION OF BROADCAST DATA MAY BE DELAYED, AND AN ADVERSE EFFECT MAY BE GIVEN TO A ROUTE SETTING. THIS COMMUNICATION STATION CAN ENTER INTO A COMMUNICATION STATE WITH A COMMUNICATION STATION IN THE POWER-SAVING MODE. IN THE CASE OF PUTTING EMPHASIS ON THE PERFORMANCE OF A ROUTE SETTING, THIS COMMUNICATION STATION MAY DETERMINE NOT TO ENTER INTO A COMMUNICATION STATE WITH A COMMUNICATION STATION WHICH OPERATES IN THE POWER-SAVING MODE. |
| ON | ON | THIS COMMUNICATION STATION IS COMPATIBLE WITH THE COMMUNICATION OF A COMMUNICATION STATION IN THE POWER-SAVING MODE, AND DISTRIBUTION OF BROADCAST DATA CAN BE EXECUTED WITH LOW-DELAY, AND ACCORDINGLY, THERE IS ALMOST NO POSSIBILITY OF HAVING AN ADVERSE EFFECT ON A ROUTE SETTING. EVEN IN THE CASE OF PUTTING EMPHASIS ON THE PERFORMANCE OF A ROUTE SETTING, THIS COMMUNICATION STATION CAN ENTER INTO A COMMUNICATION STATE WITH A COMMUNICATION STATION IN THE POWER-SAVING MODE. |

Also, of the communication station attributes shown in the above Table 1, (3) power-saving mode and (4) relay intention are attributes relating to a communication station which operates in the power-saving mode, and the ON/OFF combinations of these attributes (presence/absence of equipped functions) have meanings such as shown in the following table. Accordingly, the communication stations can accurately recognize whether or not this station should be set to a relay station at the time of multi-hop communication, based on the combinations of the attributes (C) and (D) of the partner station.

TABLE 3

| (C) POWER-SAVING MODE | (D) RELAY INTENTION | MEANINGS |
|---|---|---|
| OFF | OFF | THIS COMMUNICATION STATION DOES NOT ENTER INTO THE POWER-SAVING MODE, BUT HAS NO INTENTION TO OPERATE AS A RELAY STATION. |
| OFF | ON | THIS COMMUNICATION STATION DOES NOT ENTER INTO THE POWER-SAVING MODE, AND HAS INTENTION TO OPERATE AS A RELAY STATION. THIS MEANS THAT THIS COMMUNICATION STATION IS A USUAL COMMUNICATION STATION COMPATIBLE WITH MULTI-HOP COMMUNICATION. |
| ON | OFF | THIS COMMUNICATION STATION OPERATES IN THE POWER-SAVING MODE, AND HAS NO INTENTION TO OPERATE AS A RELAY STATION. |
| ON | ON | THIS COMMUNICATION STATION OPERATES IN THE POWER-SAVING MODE, BUT HAS INTENTION TO OPERATE AS A RELAY STATION. A COMMUNICATION ROUTE MAY BE SET USING A ROUTE WITH THIS COMNUNICATION STATION AS A RELAY STATION, BUT IN THE CASE THAT THERE IS ANOTHER RELAY ROUTE, IT IS DESIRABLE TO USE THE OTHER ROUTE. |

Note that a case where all of (A) through (D) of the attribute information are exchanged between communication stations has been used as an example, but there is also an embodiment wherein only a part of these attribute information are exchanged. Even in such a case, the same advantages as those shown in the above embodiment can be expected partially.

D. Active Relay Intention and Active Route Setting Request

With the above description, the case has been assumed wherein the power-saving mode of a communication station having relay intention is fixed. However, the communication stations sometimes change the mode according to the traffic transfer situation, such as operating in the sleep mode only when not serving as a frame transfer station, and operating in the active mode when serving as a frame transfer station.

The communication stations sometimes annunciate the attribute indicating whether to execute relay processing in which of the sleep mode or active mode as to peripheral stations as the attribute relating to "relay intention" shown in FIG. 7, Table 1, and Table 3 in the same way. In this case, there are the following three types as relay intention, and consequently, at least the following three values are represented as the attribute.

TABLE 4

| (D) RELAY INTENTION | MEANINGS |
|---|---|
| OFF | THERE IS NO INTENTION TO OPERATE AS A RELAY STATION. |
| ON (SLEEP) | THERE IS INTENTION TO OPERATE AS A RELAY STATION, BUT RELAY IS EXECUTED STILL IN THE SLEEP MODE. |
| ON (ACTIVE) | THERE IS INTENTION TO OPERATE AS A RELAY STATION, AND RELAY IS EXECUTED AFTER PROCEEDING TO THE ACTIVE MODE. |

As described above, a communication station having relay intention in the active mode earnestly participates in the network such that the communication station may be under the sleep mode when a route is set, but even if so, upon becoming a part of the route, the self station proceeds to the active mode to execute relay.

With a communication station which has frame relay intention, and has declared so, upon receiving a route setting request, based on this, in the case of determining that the self station may become a relay station of an effective and active route on a later stage, the communication station activates the timer, and holds an Awake state in a while even in the case that the communication station is under the sleep mode at present. In the case that an active route has not been set, and a frame using this route has not been transferred until the timer expires, the communication station proceeds to a Doze state from an Awake state.

Also, with the above description, it has been assumed that a route setting request is determined based on a single metric, but other than this, a route setting request may be determined while taking into consideration whether or not a relay station in the sleep mode should be included in a route. For example, the setting source of a route specifies whether to intend to create a route only with a relay station in the active mode, or whether or not a relay station in the sleep mode may be included in a route to be created. Subsequently, in the case that delay in data transfer is not allowable, the route source requests to create a route using only a relay station in the active mode. On the other hand, in the case that delay is allowable, but it is desirable to search routes as widely as possible, the route source requests that a relay station in the sleep mode may be included in the route.

In such a case, a RREQ issued from a communication station which requests setting of a route includes information indicating whether to request all of the frame relay stations within a route to be set to operate under the active mode. For example, this information is named as "delay request", and in the case of requesting all of the relay stations to operate in the active mode, "delay request" is defined to be ON.

Each of the communication stations confirms the "relay intention" regarding peripheral communication stations beforehand. Subsequently, at the time of transferring control data relating to a route setting for multi-hop communication, determination is made such as shown in the following table whether to transfer this control data to each of the peripheral communication stations according to a combination between the attribute of relay intention confirmed beforehand and the delay request indicated with a route setting request.

In the drawing, upon a route setting request involving a delay request occurring, the STA-A immediately transmits the control data of the route setting request to the STA-B which is in the active mode (packet (0) in the drawing). Further, the STA-B immediately transfers the control data of the route setting request received from the STA-A to the STA-D (packet (1) in the drawing).

Here, the route setting request involves a delay request, and accordingly, the STA-A does not transmit the control data of the route setting request wastefully to the STA-C having relay intention but having no plan to execute relay in the active mode. That is to say, execution of wasteful transmission and reception can be prevented.

TABLE 5

| (D) RELAY INTENTION | (E) DELAY REQUEST | MEANINGS |
| --- | --- | --- |
| OFF | OFF | THIS COMMUNICATION STATION HAS NO INTENTION TO OPERATE AS A RELAY STATION. RREQ DOES NOT HAVE TO BE DISTRIBUTED TO THIS COMMUNICATION STATION AS LONG AS THIS COMMUNICATION STATION IS NOT A DESTINATION. |
| OFF | ON | THIS COMMUNICATION STATION HAS NO INTENTION TO OPERATE AS A RELAY STATION. RREQ DOES NOT HAVE TO BE DISTRIBUTED TO THIS COMMUNICATION STATION AS LONG AS THIS COMMUNICATION STATION IS NOT A DESTINATION. |
| ON (SLEEP) | OFF | THIS COMMUNICATION STATION IS IN THE SLEEP MODE, AND HAS INTENTION TO OPERATE AS A RELAY STATION. RREQ HAS NO DELAY REQUEST, AND ACCORDINGLY, THERE IS A POSSIBILITY THAT THIS COMMUNICATION STATION BECOMES A RELAY STATION. RREQ HAS TO BE DISTRIBUTED TO THIS COMMUNICATION STATION. |
| ON (SLEEP) | ON | THIS COMMUNICATION STATION IS IN THE SLEEP MODE, AND HAS INTENTION TO OPERATE AS A RELAY STATION, BUT RREQ HAS A DELAY REQUEST, AND ACCORDINGLY, THIS COMMUNICATION STATION DOES NOT BECOME A RELAY STATION. RREQ DOES NOT HAVE TO BE DISTRIBUTED TO THIS COMMUNICATION STATION AS LONG AS THIS COMMUNICATION STATION IS NOT A DESTINATION. |
| ON (ACTIVE) | OFF | THIS COMMUNICATION STATION IS IN THE ACTIVE MODE, AND HAS INTENTION TO OPERATE AS A RELAY STATION, AND ACCORDINGLY, RREQ HAS TO BE DISTRIBUTED TO THIS COMMUNICATION STATION. |
| ON (ACTIVE) | ON | THIS COMMUNICATION STATION IS IN THE ACTIVE MODE, AND HAS INTENTION TO OPERATE AS A RELAY STATION, AND ACCORDINGLY, RREQ HAS TO BE DISTRIBUTED TO THIS COMMUNICATION STATION. |

Now, as shown in FIG. 25, let us assume a case where there are four communication stations STA-A through STA-D, and multi-hop communication is executed between the STA-A and the STA-D. The STA-B and STA-C become relay candidate stations. However, the STA-B is in the active mode, and the STA-C has entered into the sleep mode. Let us say that the STA-C proceeds to the sleep mode on the assumption that the communication stations such as the STA-A and STA-B adjacent to the STA-C support a power-saving assistance function, and further, the STA-A supports the above low-delay broadcast distribution function. Further, now, let us say that it has annunciated that the STA-C has relay intention under the sleep mode, and the STA-A has known this fact beforehand.

In such a case, a data distribution procedure for executing setting of a route of which the delay request is ON with the STA-A as the starting point will be described with reference to FIG. 9 (described above).

Next, with a communication station layout similar to that shown in FIG. 25, let us consider with reference to FIG. 10 (described above) regarding a distribution procedure in the case of assuming that the STA-C has proceeded to the active mode and has annunciated that the STA-C has relay intention, and the STA-A has already known this fact. However, the STA-B is in the active mode, and the STA-C has entered into the sleep mode (let us say that the STA-C proceeds to the sleep mode on the assumption that the communication stations such as the STA-A and STA-B adjacent to the STA-C support a power-saving assistance function) (similar to the above).

In FIG. 10, upon a route setting request involving a delay request occurring, the STA-A immediately transmits the control data of the route setting request to the STA-B which is in the active mode (packet (0) in the drawing). Further, the STA-A attempts to transmit the same control data to the adjacent STA-C, but the STA-C is in a Doze state under the sleep mode, and accordingly, transmission of this data is postponed to the next TBTT and thereafter.

The STA-B immediately transfers the control data of the route setting request received from the STA-A (packet (0) in the drawing) to the STA-D (packet (1) in the drawing). Accordingly, the STA-A can distribute the control data of the route setting request with less delay quantity T3 as to the STA-D serving as a desired destination station.

On the other hand, as described above, the STA-A transmits the control data of the route setting request (packet (2) in the drawing) to the STA-C which has declared relay intention in the active mode at a time zone where the STA-C is in a reception state (i.e., the next TBTT). Subsequently, the STA-C immediately transfers the control data of the route setting request received from the STA-A to the STA-D (packet (3) in the drawing).

Note that in the case that the STA-A does not support the low-delay broadcast distribution function, the control data of the route setting request may be transmitted to the STA-B and STA-C simultaneously after a TBTT.

With the above data distribution processing procedure, multiple pieces of route setting data arrive at the route destination station STA-D due to that the relay candidate station STA-C which was under the sleep mode has proceeded to the active mode and has declared relay intention. Accordingly, either the STA-B or the STA-C is selected as a relay station in accordance with the processing procedure shown in FIG. 12.

Note that the STA-C which operates under the sleep mode receives the control data of the route setting request involving a delay request, and processes this, thereby holding an Awake state. Further, subsequently, in the case that the self station has been selected as a relay station, the STA-C changes the operation mode to the active mode to execute frame relay between the STA-A and the STA-D. Also, the STA-C may immediately change to the active mode due to that the control data of the route setting request has been received and processed. The STA-C may receive the control data of a route setting request not involving a delay request, and process this, thereby holding an Awake state, and further, proceeding to the active mode.

With a communication station having intention to execute relay only in the sleep mode, in the case of receiving a route setting request involving a delay request from a peripheral communication station, this is discarded as long as the self station is not the destination of this route. Also, a communication station having intention to execute relay only in the sleep mode may proceed to the active mode to change to a communication station having intention to execute relay due to that a route setting request involving a delay request has been received from a peripheral communication station, and may process this control data. In the case of the latter, the communication station proceeds to the active mode.

The communication station which has proceeded to the active mode from the sleep mode according to a route setting returns to the sleep mode again after this route is eliminated due to timeout or the like.

Figure 26:
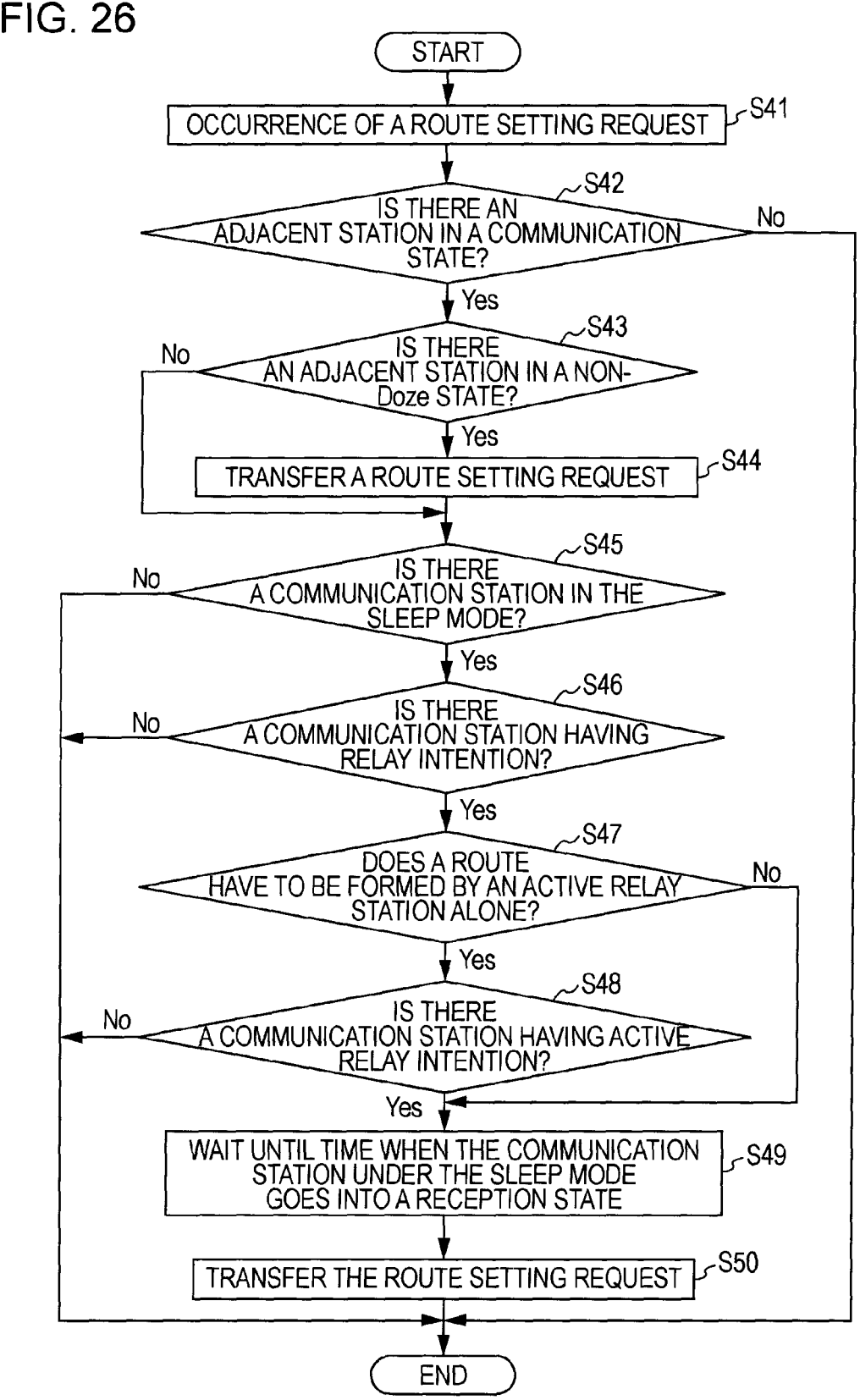
FIG. 26 is a flowchart illustrating a processing procedure used for a communication station transmitting a route setting request involving the specification of a delay request.

FIG. 26 illustrates a processing procedure used for a communication station transmitting a route setting request involving the specification of a delay request in a flowchart format. However, let us say that a communication station which issues a route setting request supports a power-saving assistance function, and recognizes whether or not an adjacent station is under the sleep mode, and timing when each of the adjacent stations which is under the sleep mode enters into an Awake state. With the data distribution procedures shown in FIG. 9 and FIG. 10, when executing a route setting request used for executing multi-hop communication between the STA-A and the STA-D, this processing procedure should be executed.

Upon a route setting request occurring at a communication station (step S41), the communication station references the adjacent communication apparatus information within the information storage unit 113 to confirm an adjacent station which is now in a communication state (step S42).

Here, in the case that there is no adjacent station in a communication state (No in step S42), the communication station skips all the subsequent processing steps, and ends this processing routine.

On the other hand, in the case that there is an adjacent station which is in a communication state (Yes in step S42), further of the adjacent stations which are in a communication state, the communication station extracts adjacent stations of which the receivers are in an Awake state (step S43). Subsequently, the communication station immediately transmits the control data of the route setting request to the adjacent stations of which the receivers are in an Awake state in a broadcast manner (step S44).

The communication stations of which the receivers are in an Awake state include a communication station which is under the active mode (i.e., not under the sleep mode), and a communication station which is under the sleep mode, but is now in an Awake state. A communication station serving as a power-saving assistance station recognizes these states regarding adjacent stations through preliminary exchange of attribute information such as a beacon signal.

Also, of the adjacent stations which are in a communication state, when there is an adjacent station which is now in a Doze state (No in step S43), confirmation is made that the adjacent station thereof is operating under the sleep mode (Yes in step S45), following which determination is further made whether or not the adjacent station thereof is a communication station which has declared relay intention (step S46).

Here, when the communication station which is under the sleep mode has no relay intention (No in step S46), the communication station thereof does not become a relay station candidate, and accordingly, all the following processing steps are skipped, and this processing routine is ended. In this case, the control data of the route setting request is not transmitted wastefully to the adjacent station having no relay intention, i.e., execution of wasteful transmission and reception can be prevented.

On the other hand, when the communication station which is under sleep mode has relay intention (Yes in step S46), this can become a relay candidate station, but determination is further made whether or not this route setting request involves a delay request (step S47).

Here, in the case that this route setting request involves a delay request, and there is a need to form a route only with a relay station which is in the active mode (Yes in step S47), determination is subsequently made whether or not the relay intention of the adjacent station is relay intention in the active mode (step S48).

In the case that the adjacent station has only relay intention in the sleep mode (No in step S48), the subsequent processing steps are skipped, and this processing routine is ended.

On the other hand, in the case that the adjacent station has relay intention in the active mode (Yes in step S48), or in the case that this route setting request does not involve a delay request, and a relay station which is in the sleep mode may be included in a route (No in step S47), the control data of the route setting request is transmitted (step S50) after waiting for time when this relay candidate station enters into a reception state (e.g., the next TBTT) (step S49). In this case, there is a possibility that there may be two or more routes of a route not relayed with a power-saving communication station, and a route relayed with a power-saving communication station, and two and more pieces of route setting data may arrive at the destination station of a route.

The destination station of a route may execute the processing procedure shown in FIG. 12, thereby executing an effective route setting according to determination of the self station.

Note that, with the above description, the case has been used as an example wherein all of the attribute information shown in each table are exchanged between communication stations, but there is an embodiment wherein only a portion of these attribute information is exchanged. Even in such a case, the same advantages as those of the above embodiment can be expected partially.

E. Change of Beacon Transmission Interval

As described above, when a communication station having a power-saving assistance function transmits a broadcast traffic, the "low-delay broadcast distribution" is executed wherein the same broadcast data is transmitted multiple times in sync with the timing when each of destination stations which are under the sleep mode enters into an Awake state, whereby the broadcast data can be distributed with the minimum delay.

On the other hand, a communication station which is under the sleep mode usually restores to an Awake state from a Doze state in sync with the TBTT of an adjacent station to execute a reception operation. Here, upon prolonging the TBTT, i.e., the beacon transmission interval, the frequency that the communication station executes a reception operation is reduced, and accordingly, the advantage of low consumption power is improved. However, upon prolonging the beacon transmission interval, when a route setting request used for multicast communication within the system, or another broadcast traffic occurs, necessary time until data transmission to all the destination stations is completed is prolonged even using low-delay broadcast distribution. That is to say, in association with the beacon transmission interval, trade-off holds between the delay quantity of data transmission, and consumption power.

Therefore, when determining that there is no traffic to be transmitted or received, the communication station proceeds to the sleep mode from the active mode, but thereafter, executes an operation taking into consideration the above trade-off. Specifically, after proceeding to the sleep mode, in accordance with taking into consideration that there is no traffic to be transmitted or received, the beacon transmission interval is extended in a stepwise manner, thereby entering into a more effective low consumption power mode. Upon extending the beacon transmission interval, a delay quantity used for distribution of data increases, but if there is little traffic within the network, such a delay quantity is allowable.

Also, a communication station which is under the sleep mode controls so as to shorten the delay quantity of data transfer by shortening the beacon transmission interval in a stepwise manner when traffic to be transmitted or received occurs, and proceeds to the active mode from the sleep mode when further a great quantity of transmission/reception traffic occurs.

Figure 14:
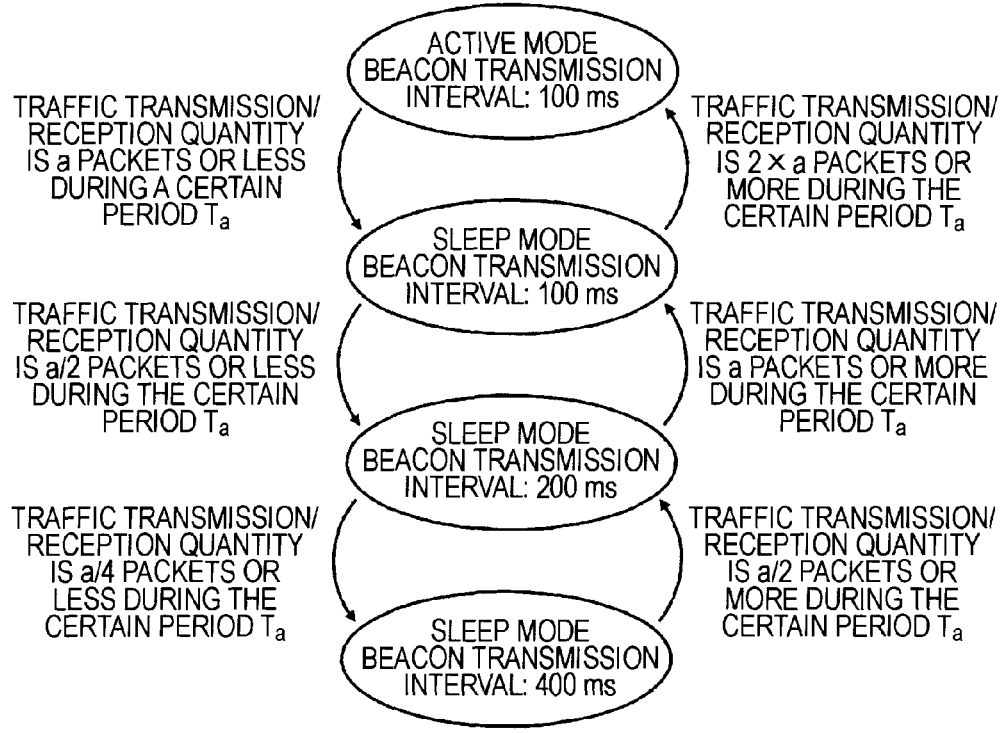
FIG. 14 is a state transition diagram illustrating an operation used for a communication station executing parameter change such as a power-saving operation mode, a beacon transmission interval, or the like according to transmission/reception traffic.

FIG. 14 illustrates an operation used for a communication station executing parameter change such as a power-saving operation mode, a beacon transmission interval, or the like according to transmission/reception traffic. With the example shown in the drawing, let us say that the beacon transmission interval under the active mode of a communication station is defined to be 100 milliseconds, and the beacon transmission interval under the sleep mode is defined to be three steps of 100 milliseconds, 200 milliseconds, and 400 milliseconds according to the presence/absence of traffic.

Here, as for the index of the presence/absence of traffic, the number of packets transmitted or received during a certain period of time $T_a$ is counted, whereby change of the above operation mode, and setting of parameters such as a beacon transmission interval and so forth can be executed according to this count value. Also, an arrangement may be made wherein the number of bits of data transmitted or received is counted instead of the number of packets per time, thereby executing setting of the above mode and parameters according to this number.

Upon the transmission/reception quantity of traffic reaching a packets or less during the certain period of time $T_a$, a communication station which is under the active mode proceeds to the sleep mode of a first stage still with the same beacon transmission interval (100 milliseconds). That is to say, the communication station shifts to an intermittent reception operation while fixing an allowable delay quantity. On the other hand, under the sleep mode of the first stage, upon the transmission/reception quantity of traffic reaching 2×a or more during the certain period of time Ta, there is a concern that relationship between the delay quantity of data transmission, and consumption power falls into imbalance, i.e., necessary time until data transmission to all of the destination stations is completed is prolonged, and accordingly, the communication station returns to the active mode.

Also, with a communication station which is under the sleep mode of the first stage, upon the transmission/reception quantity of traffic decreasing to a/2 packets or less during the certain period of time $T_a$, the possibility that a data transmission delay problem may occur decreases, the communication station proceeds to the sleep mode of a second stage where the beacon transmission interval is prolonged to 200 milliseconds, thereby realizing further low consumption power. On the other hand, under the sleep mode of the second stage, upon the transmission/reception quantity of traffic reaching a or more during the certain period of time $T_a$, there is a concern that relationship between the delay quantity of data transmission, and consumption power falls into imbalance, and accordingly, the communication station returns to the first sleep mode, where the beacon transmission interval is reduced to 100 milliseconds, and the delay quantity of data transmission is shortened.

Also, with a communication station which is under the sleep mode of the second stage, upon the transmission/reception quantity of traffic decreasing to a/4 packets or less during the certain period of time $T_a$, the possibility that a data transmission delay problem may occur decreases, the communication station proceeds to the sleep mode of a third stage where the beacon transmission interval is prolonged to 400 milliseconds, thereby realizing further low consumption power. On the other hand, under the sleep mode of the third stage, upon the transmission/reception quantity of traffic reaching a/2 or more during the certain period of time $T_a$, there is a concern that relationship between the delay quantity of data transmission, and consumption power falls into imbalance, and accordingly, the communication station returns to the second sleep mode, where the beacon transmission interval is reduced to 200 milliseconds, and the delay quantity of data transmission is shortened.

Note that, in FIG. 14, the count value that determines change of the operation mode or beacon transmission interval has been specified with 2×a, a/2, a/4, and the like in the above cases, but these values are an example, and control may be executed using another similar value.

F. Operation of Battery Driven Communication Station

As described above, with the communication system according to the present invention, a communication station which is under the sleep mode is configured to notify an adjacent station of an attribute regarding whether or not the self station has intention to become a relay station at the time of multi-hop communication. Upon setting the communication station which is under the sleep mode to a relay station, there is a concern that delay in data distribution may occur, and also opportunities to execute transmission or reception increases as for the communication station, and accordingly, a problem is caused wherein consumption power increases.

Therefore, when the communication station is driven by battery, not only the operation mode relating to power saving but also the relay intention and beacon transmission interval may be switched as appropriate according to the remaining power of the battery. Specifically, a communication station having relay intention is in the active mode in a default state, but upon the battery remaining power decreasing, proceeds to the sleep mode while maintaining the relay intention, thereby realizing low consumption power using a simple reception operation.

Also, with a communication station which has relay intention under the sleep mode, as the battery remaining power, the beacon transmission interval is gradually prolonged, thereby realizing further low consumption power. Subsequently, upon the battery remaining power decreasing to a situation wherein the operation as a relay station is difficult, the communication station dissolves the relay intention, and upon the battery remaining power further decreasing to a situation wherein a communication operation is disabled, the communication station turns off the autonomous distributed communication function itself.

Figure 15:
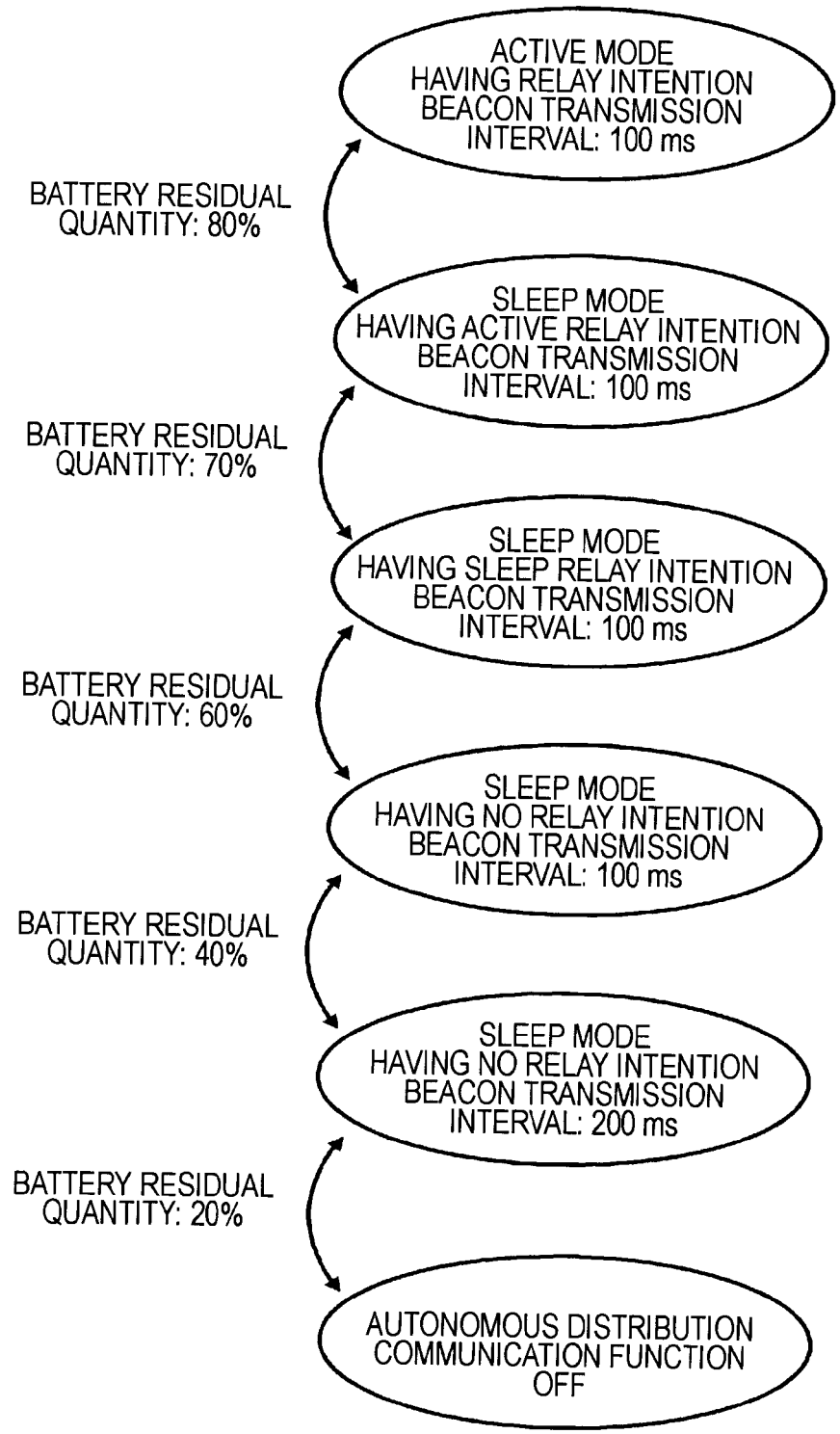
FIG. 15 is a state transition diagram illustrating an operation used for a communication station executing parameter change such as a power-saving operation mode, communication station attributes such as relay intention and the like, a beacon transmission interval, or the like according to the remaining power of a battery.
Figure 16:
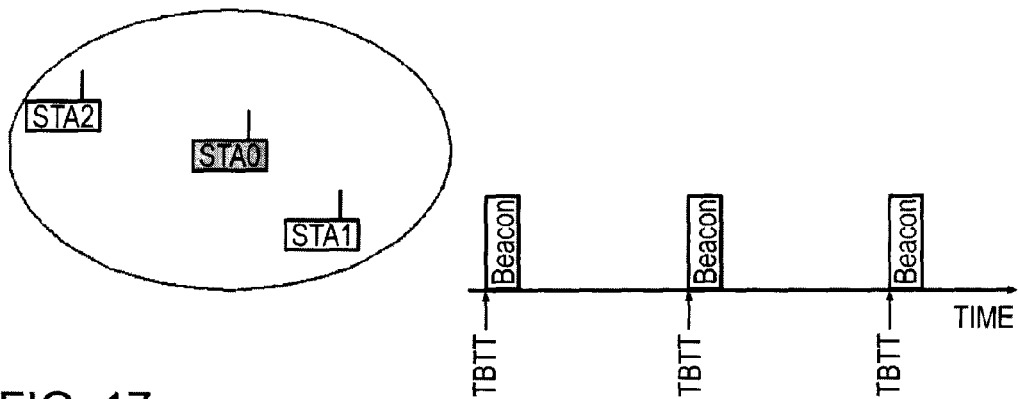
FIG. 16 is a diagram illustrating an operation example of IEEE802.11 at the time of an infrastructure mode.
Figure 17:
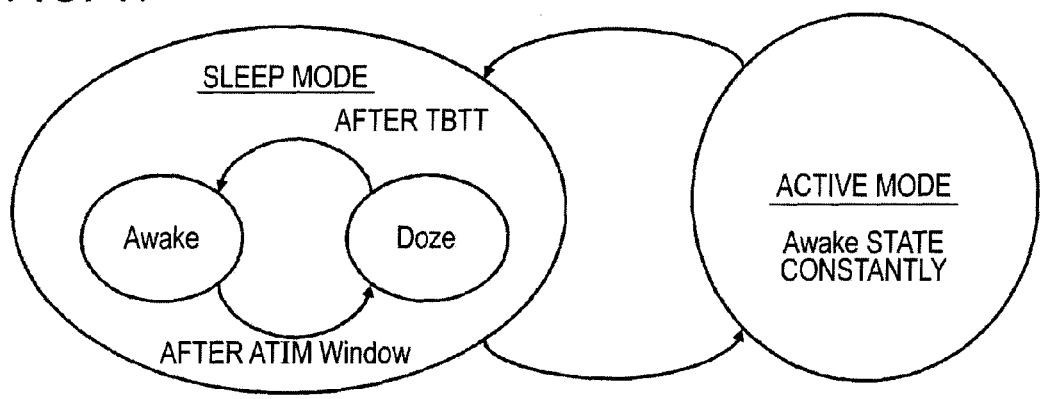
FIG. 17 is a state transition diagram relating to power saving of a communication station.
Figure 18:
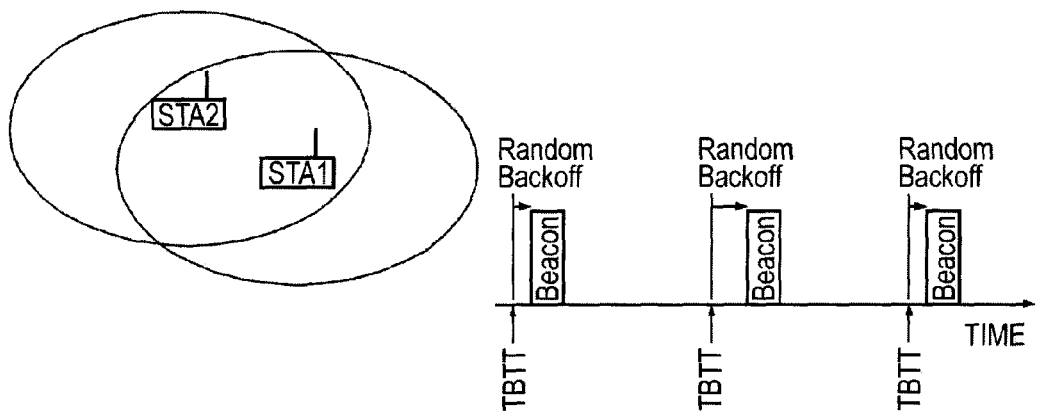
FIG. 18 is a diagram illustrating an operation example of IEEE802.11 at the time of an Ad-hoc mode.
Figure 19:
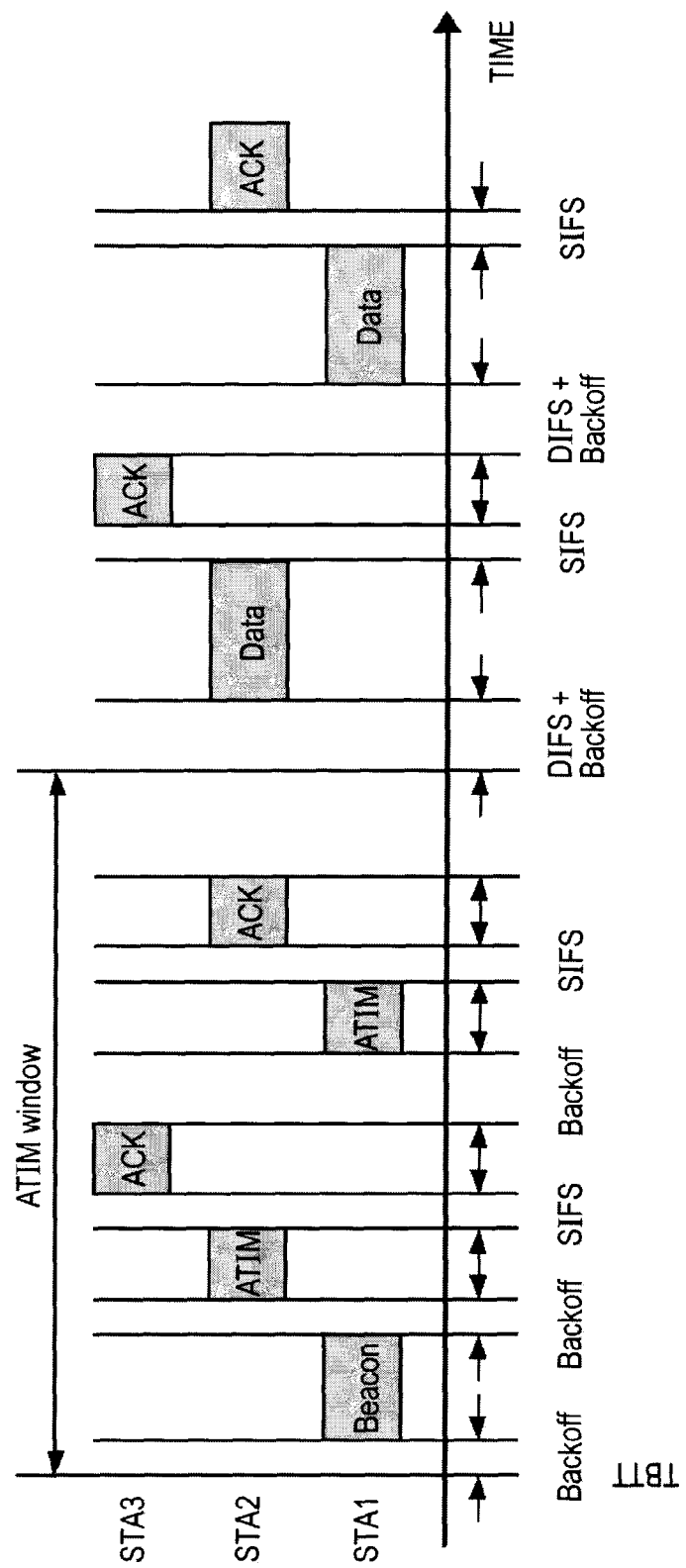
FIG. 19 is a diagram illustrating an operation example in the case that there are three MTs of STA1, STA2, and STA3 within an IBSS with IEEE802.11 at the time of the Ad-hoc mode.
Figure 20:
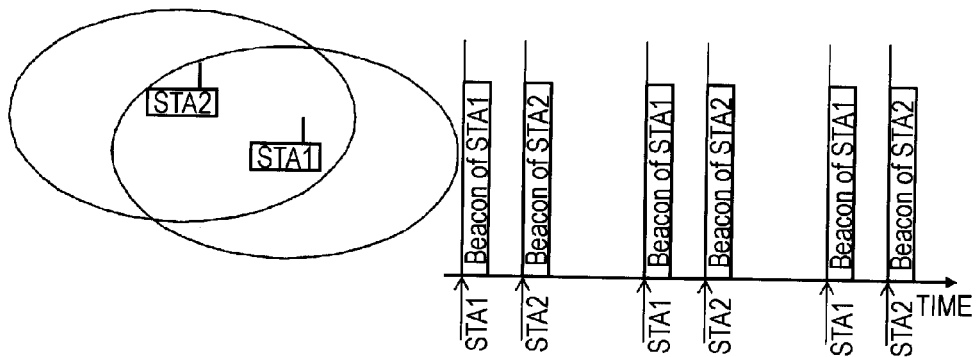
FIG. 20 is a diagram illustrating a situation (conventional example) wherein there are two stations of STA1 and STA2 serving as MTs which participate in a network in a mutual communicable range, and each of the MTs sets the corresponding TBTT to transmit a beacon signal periodically.
Figure 21:
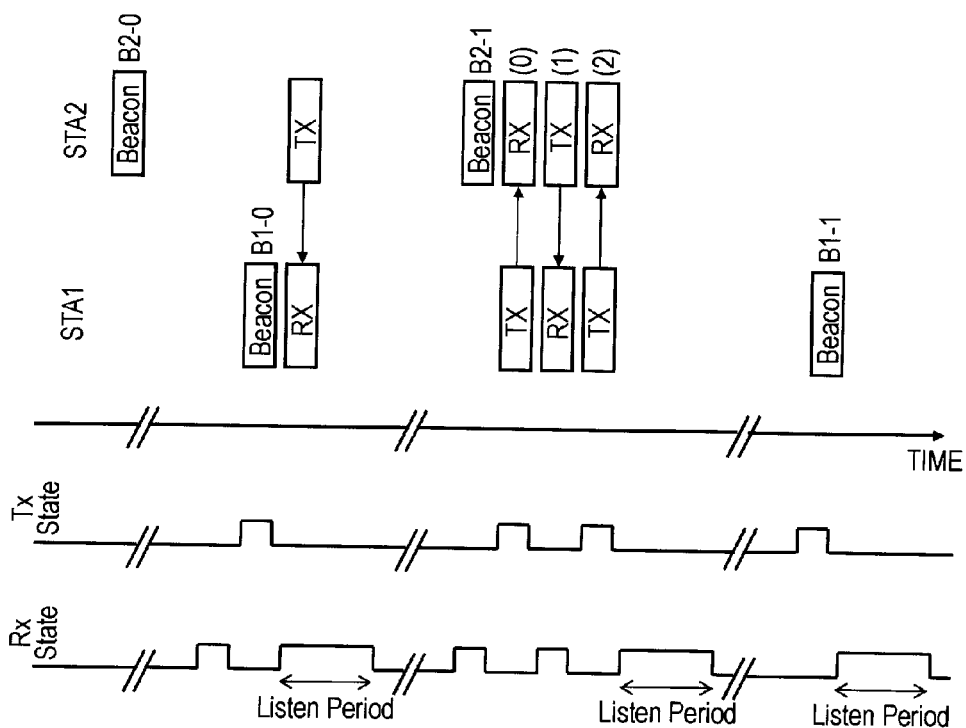
FIG. 21 is a diagram illustrating a situation (conventional example) wherein data transmission is executed from the STA2 to the STA1.

FIG. 15 illustrates an operation for a communication station executing parameter change such as the operation mode of power saving according to the remaining power of the battery, communication station attributes such as relay intention and so forth, the beacon transmission interval, and so forth. With the example shown in the drawing, the communication station declares relay intention under the active mode, and operates with the beacon transmission interval of 100 milliseconds. Also, under the sleep mode, two types of 100 milliseconds and 200 milliseconds are defined as the beacon transmission interval of the communication station, the presence/absence of relay intention is switched according to the battery remaining power, and four stages of sleep modes are defined with a combination of the beacon transmission intervals and the presence/absence of relay intention.

Upon the battery remaining power reaching 80% or more, the communication station declares relay intention in the active mode, and operates with a short beacon transmission interval of 100 milliseconds. Here, upon the remaining power of the battery decreasing to below 80%, the communication station proceeds to the sleep mode of the first stage. Under the first sleep mode, the communication station executes an intermittent reception operation with the same beacon transmission interval of 100 milliseconds, and continuously executes active relay. The delay quantity allowable in the first sleep mode is generally the same as with the active mode. On the other hand, under the first sleep mode, upon the battery remaining power restoring to 80% or more due to a charging operation, a reception operation is constantly executed, and accordingly, an effective relay station operation can be executed, the communication station returns to the active mode.

Also, under the first sleep mode, upon the remaining power of the battery further decreasing to below 70%, there is a concern regarding exhaustion of the battery when operating with a short beacon transmission interval, the communication station proceeds to the second sleep mode. Under the second sleep mode, the communication station is changed to execute an intermittent reception operation with the same beacon transmission interval of 100 milliseconds, and to execute inactive relay (i.e., execute relay still in the sleep mode). On the other hand, under the second sleep mode, upon the battery remaining power restoring to 70% or more due to a charging operation, the communication station has to execute an intermittent reception operation to restore the battery, but can execute an active relay operation, thereby restoring to the first sleep mode.

Also, under the second sleep mode, upon the remaining power of the battery further decreasing to below 60%, when operating as a relay station, the communication station has difficulty in suppressing exhaustion of the battery sufficiently, and accordingly, proceeds to the third sleep mode. Under the third sleep mode, the communication station executes an intermittent reception operation with the same beacon transmission interval of 100 milliseconds, but dissolves the relay intention completely. On the other hand, under the third sleep mode, upon the battery remaining power restoring to 60% or more due to a charging operation, the communication station has to execute an intermittent reception operation to restore the battery, but can execute a relay station operation still in the sleep mode, thereby restoring to the second sleep mode.

Also, under the third sleep mode, upon the remaining power of the battery further decreasing to below 40%, there is a concern regarding exhaustion of the battery when operating still with the beacon transmission interval of 100 milliseconds, the communication station proceeds to the fourth sleep mode. Under the fourth sleep mode, the communication station has difficulty in restoring the remaining power of the battery sufficiently only by stopping a relay station operation, and accordingly, executes an intermittent reception operation with a further longer beacon transmission interval of 200 milliseconds. On the other hand, under the fourth sleep mode, upon the battery remaining power restoring to 40% or more due to a charging operation, the communication station has to execute an intermittent reception operation to restore the battery, but can execute an active relay station operation, thereby restoring to the third sleep mode.

Also, under the fourth sleep mode, upon the remaining power of the battery further decreasing to below 20%, exhaustion of the battery is serious, when continuing an intermittent reception operation, the communication station has difficulty in restoring the remaining power of the battery sufficiently, and accordingly, changes a communication function as a communication station which operates autonomously to an off state. This situation is equivalent to an operation as an MT in the infrastructure mode of the conventional IEEE802.11. At this time, in the case that there is an AP nearby, the communication station attempts connection to the AP thereof. On the other hand, upon the battery remaining power restoring to 20% or more with the off state of the communication function, the relay station operation is disabled, but an intermittent reception operation is executable, thereby restoring to the fourth sleep mode.

The operation mode of a communication station, the presence/absence of relay intention, and the beacon transmission interval represent the degree of willingness to participate in the network. Accordingly, according to the above operations, the communication station can control how positively the communication station participates in the network, according to the battery remaining power.

Note that, in FIG. 15, the threshold of the battery remaining power has been specified with 80%, 70%, 60%, 40%, and 20% in the above cases, but these values are an example, and control may be executed using another similar value. Industrial Applicability The present invention has been described in detail with reference to the particular embodiment. However, it is fully apparent that one skilled in the art can make various modifications and substitutions to the embodiment without departing from the spirit and scope of the present invention.

With the present specification, description has been made centered on an embodiment applied to the wireless LAN system such as IEEE802.11, but the spirit and scope of the present invention is not restricted to this. With a communication environment wherein multiple communication stations operate in an autonomous distributed manner, and each communication station executes a transmission/reception operation intermittently, the present invention can be applied to a case where a certain communication station transmits a broadcast traffic, or a case where a route setting request for multi-hop communication is transferred, and a relay station is set, in the same way.

That is to say, the present invention has been disclosed in an exemplification mode, and the description content of the present specification is not to be interpreted in a restrictive manner. The claims should be referred to in order to determine the essence of the present invention.

The invention claimed is:

1. A communication system characterized in being made up of a plurality of communication stations which operate in an autonomous distributed manner,
    wherein at least a part of the communication stations are power-saving communication stations which operate in a sleep mode where a transmitter and a receiver are operated in an intermittent manner, and at least a part of the other communication stations are power-saving assistance stations having capabilities to communicate with said power-saving communication stations; and
    wherein at least a part of said power-saving assistance stations have a low-delay broadcast distribution function to execute data transmission each time each of the communication stations serving as a transmission destination enters into an active state for activating the receiver, at the time of broadcast data distribution.

2. The communication system according to claim 1, characterized in comprising:
    means configured to mutually notify communication station attributes regarding whether or not each communication station is a power-saving communication station, whether or not each communication station is a power-saving assistance station, or whether or not each communication station has the low-delay broadcast distribution function.

3. The communication system according to claim 2, characterized in being the communication stations which have notified the communication station attributes mutually determining whether to enter into a communication state based on matching results of the mutual communication station attributes.

4. The communication system according to claim 3, characterized in the power-saving communication stations selecting not to enter into a communication state with a communication station which is not a power-saving assistance station, or the communication stations which are not a power-saving assistance station selecting not to enter into a communication state with a power-saving communication station.

5. The communication system according to claim 3, characterized in the power-saving communication stations selecting whether to enter into a communication state with a power-saving assistance station having no low-delay broadcast distribution function while taking into consideration restrictions relating to distribution delay imposed on the system.

6. A communication apparatus which executes data communication under a communication environment made up of a plurality of communication stations which operate in an autonomous distributed manner, characterized in comprising:
    communication means configured to execute transmission/reception with said communication environment;
    communication control means configured to control a communication operation by said communication means;
    power-saving assistance means configured to recognize that each adjacent communication station operates in a sleep mode for operating a transmitter and a receiver in an intermittent manner; and
    low-delay broadcast distribution means configured to execute data transmission each time each communication station serving as a transmission destination enters into an active state for activating the receiver at the time of executing broadcast data distribution as to the plurality of communication stations.

7. The communication apparatus according to claim 6, characterized in further comprising:
    notifying means configured to mutually notify an adjacent communication station of communication station attributes regarding whether or not the self station operates in the sleep mode for operating the transmitter and the receiver intermittently, whether or not the self station includes said power-saving assistance means, or whether or not the self station includes the low-delay broadcast distribution means.

8. The communication apparatus according to claim 6, characterized in said communication control means determining whether to enter into a communication state with each adjacent communication station based on matching results of the mutual communication station attributes.

9. A communication apparatus characterized in executing data communication under a communication environment made up of a plurality of communication stations which operate in an autonomous distributed manner, comprising:
    communication means configured to execute transmission/reception with said communication environment;
    communication control means configured to control a communication operation by said communication means; and
    notifying means configured to mutually notify an adjacent communication station of communication station attributes regarding whether or not the self station is a power-saving communication station which operates in a sleep mode for operating the transmitter and the receiver of said communication means intermittently, whether or not the self station is a power-saving assistance station which can handle data communication with a communication station which operates in a sleep mode, or whether or not the self station has a low-delay broadcast distribution function for executing data transmission each time each communication station serving as a transmission destination enters into an active state for activating the receiver;
    wherein said communication control means determine whether to enter into a communication state with each adjacent communication station based on matching results of the mutual communication station attributes.

10. The communication apparatus according to claim 9, characterized in said communication control means determining to enter into a communication state with a communication station having said low-delay broadcast distribution function at the time of the self station operating in the sleep mode.

11. The communication apparatus according to claim 10, characterized in said communication control means determining to enter into a communication state with a communication station not having said low-delay broadcast distribution function when restrictions are not imposed on broadcast data delay under said communication environment.

12. A communication method characterized in being arranged to execute data communication under a communication environment made up of a plurality of communication stations which operate in an autonomous distributed manner, comprising:
   a power-saving assistance step arranged to recognize that each adjacent communication station operates in a sleep mode for operating a transmitter and a receiver intermittently; and
   a low-delay broadcast distribution step arranged to execute data transmission each time each communication station serving as a transmission destination enters into an active state for activating the receiver at the time of executing broadcast data distribution as to the plurality of communication stations.

13. A communication method characterized in being arranged to execute data communication under a communication environment made up of a plurality of communication stations which operate in an autonomous distributed manner, comprising:
   a notifying step arranged to mutually notify an adjacent communication station of communication station attributes regarding whether or not the self station is a power-saving communication station which operates in the sleep mode for operating a transmitter and a receiver intermittently, whether or not the self station is a power-saving assistance station which can handle data communication with a communication station which operates in a sleep mode, or whether or not the self station has a low-delay broadcast distribution function for executing data transmission each time each communication station serving as a transmission destination enters into an active state for activating the receiver; and
   a determining step arranged to determine whether to enter into a communication state with each adjacent communication station based on matching results of the mutual communication station attributes at the time the self station operating in the sleep mode;
   wherein, in said determining step, determination is made to enter into a communication state with a communication station having said low-delay broadcast distribution function, and also to enter into a communication state with a communication station not having said low-delay broadcast distribution function when restrictions are not imposed on broadcast data delay under the communication environment.

14. A computer program characterized in being described in a computer-readable format store in a non-transitory computer readable medium so as to execute processing for executing data communication on a computer under a communication environment made up of a plurality of communication stations which operate in an autonomous distributed manner, causing said computer to execute:
   a power-saving assistance procedure arranged to recognize that each adjacent communication station operates in a sleep mode for operating a transmitter and a receiver intermittently; and
   a low-delay broadcast distribution procedure arranged to execute data transmission each time each communication station serving as a transmission destination enters into an active state for activating the receiver at the time of executing broadcast data distribution as to the plurality of communication stations.

15. A computer program characterized in being described in a computer-readable format store in a non-transitory computer readable medium so as to execute processing for executing data communication on a computer under a communication environment made up of a plurality of communication stations which operate in an autonomous distributed manner, causing said computer to execute:
   a notifying procedure arranged to mutually notify an adjacent communication station of communication station attributes regarding whether or not the self station is a power-saving communication station which operates in a sleep mode for operating a transmitter and a receiver intermittently, whether or not the self station is a power-saving assistance station which can handle data communication with a communication station which operates in the sleep mode, or whether or not the self station has a low-delay broadcast distribution function for executing data transmission each time each communication station serving as a transmission destination enters into an active state for activating the receiver; and
   a determining step arranged to determine whether to enter into a communication state with each adjacent communication station based on matching results of the mutual communication station attributes at the time the self station operating in the sleep mode;
   wherein, in said determining procedure, determination is made to enter into a communication state with a communication station having said low-delay broadcast distribution function, and also to enter into a communication state with a communication station not having said low-delay broadcast distribution function when restrictions are not imposed on broadcast data delay under said communication environment.

* * * * *